(12) United States Patent
Yano et al.

(10) Patent No.: US 7,031,551 B2
(45) Date of Patent: Apr. 18, 2006

(54) NOISE REDUCTION APPARATUS, NOISE REDUCTION METHOD, PROGRAM AND MEDIUM

(75) Inventors: Shuji Yano, Neyagawa (JP); Takeshi Hamasaki, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 756 days.

(21) Appl. No.: 10/238,499

(22) Filed: Sep. 10, 2002

(65) Prior Publication Data

US 2003/0068092 A1    Apr. 10, 2003

(30) Foreign Application Priority Data

Sep. 11, 2001    (JP) ............................. 2001-275569

(51) Int. Cl.
    *G06K 9/40*   (2006.01)
(52) U.S. Cl. ........................ 382/275; 382/260; 348/607
(58) Field of Classification Search ................ 382/275, 382/260, 264; 348/607
    See application file for complete search history.

(56) References Cited

U.S. PATENT DOCUMENTS

| 4,573,070 | A |   | 2/1986 | Cooper |
| 5,105,274 | A |   | 4/1992 | Sakamoto |
| 6,788,823 | B1 | * | 9/2004 | Allred et al. ............... 382/260 |
| 6,907,144 | B1 | * | 6/2005 | Gindele ...................... 382/275 |
| 6,933,983 | B1 | * | 8/2005 | Wredenhagen et al. ..... 348/618 |

FOREIGN PATENT DOCUMENTS

JP    3-112275    5/1991

* cited by examiner

*Primary Examiner*—Sanjiv Shah
(74) *Attorney, Agent, or Firm*—RatnerPrestia

(57) ABSTRACT

A noise reduction apparatus with simultaneous processing for allowing Simultaneous processing of image signals of a portion containing a noise processing object pixel to be inputted, wherein the image signals are existing at Spatially different locations or the image signals are contained in fields or frames at different times. A filtering is performed by low pass filter. A noise component extractor extracts noise components based upon outputs of the filter operation and noise attenuation means of attenuating noise using outputs of the noise components extraction means with respect to the noise processing object pixel within the outputs of the simultaneous processing means.

11 Claims, 26 Drawing Sheets

Fig. 10

| input | 1 | 2 | 3 | 4 | 5 | 6 | 7 | 8 | 9 | 10 | 11 | 12 | 13 |
|---|---|---|---|---|---|---|---|---|---|---|---|---|---|
| output | 1 | 2 | 2 | 4 | 4 | 4 | 4 | 8 | 8 | 8 | 8 | 8 | 16 |

NOISE REDUCTION APPARATUS, NOISE REDUCTION METHOD, PROGRAM AND MEDIUM

BACKGROUND OF THE INVENTION

1. Field of the Invention

The present invention relates to a noise reduction apparatus, a noise reduction method, programs and media used for image equipment such as, for example, televisions, videos or the like.

2. Related Art of the Invention

A noise reduction apparatus for achieving high image quality in conventional video equipment is referred to herein.

For such noise reduction apparatuses, there are two types; one is a three-dimensional (3-D) noise reduction apparatus for achieving noise reduction based upon differences between signal fields or frames using memories, etc., and the other is a two-dimensional (2-D) noise reduction apparatus for achieving noise reduction based upon signals in the same field or frame.

Additionally, the 2-D noise reduction apparatus is broadly grouped into two types, one uses a nonlinear type filter such as a median filter and the other uses a spatial low pass filter (LPF), and the latter one will be referred to herein.

The 2-D spatial LPF reduces noise having spatial high frequency components by performing LPF processing in the horizontal direction and the vertical direction of image signals, however if the LPF processing is simply performed, deterioration of the image quality such as a dull-edge and resolution degradation is generated because the high frequency components are attenuated in a edge portion and a detail portion of the image.

Therefore, a 2-D adaptive type LPF referred to hereafter is devised in order to prevent deterioration of the image quality. FIG. 19 is a block diagram showing one example of the 2-D adaptive type LPF.

Simultaneous processing means 101 in FIG. 19 comprises a 2-D signal block consisting of a plurality of pixels based upon image signals inputted from an input terminal S1.

One example of such a signal block is shown in FIG. 20. FIG. 20 shows a case where the signal block consists of 13 pixels, and subscripts of the lower-right of a character "a" designate the locations. Where, $a_{i,j}$ is called a processing object pixel and pixels excluding $a_{i,j}$ are called peripheral pixels located around the periphery of the processing object pixel $a_{i,j}$.

In addition, one example of the simultaneous processing means required for forming the signal block in FIG. 20 is shown in FIG. 21. In FIG. 21, reference numerals 201a and 201b designate 1H (H: horizontal scanning period) delay elements and reference numerals 202a–202o designate 1T (T: horizontal sampling period) delay elements respectively.

Subtracting means $102_1$–$102_n$ (in the case of the signal block in FIG. 20, n=12) output differences obtained after subtracting a value of the processing object pixel $a_{i,j}$ from values of the peripheral pixels excluding the processing object pixel $a_{i,j}$ in FIG. 20.

Each correlation detector $103_1$–$103_n$ compares the output value from the subtracting means $102_1$–$102_n$ with a pregiven threshold value and, if the output value is lower than the threshold value, outputs a level "1" by determining that there is a correlation between the processing object pixel $a_{i,j}$ and the peripheral pixel excluding the processing object pixel $a_{i,j}$, if not, a level "0" is outputted.

Counting means 104 counts the number of "1"s appeared in the outputs of the correlation detectors $103_1$–$103_n$, i.e., the number of peripheral pixels determined to be in correlation with the processing object pixel $a_{i,j}$, and outputs the value as a numeric value to be a divisor in average value processing. Further, the counting means 104 outputs location information about the peripheral pixels determined to be in correlation with the processing object pixel $a_{i,j}$ as well.

Selection means 105 selects all the differences between the peripheral pixels determined to be in correlation with the processing object pixel $a_{i,j}$ and the processing object pixel $a_{i,j}$ out of the outputs from the subtracting means $102_1$–$102_n$ according to the location information about the peripheral pixels determined to be in correlation with the processing object pixel $a_{i,j}$ outputted from the counting means 104 and the processing object pixel $a_{i,j}$, and outputs them to a first adding means 106 without processing then.

By taking a specific example using the signal block shown in FIG. 20, if four peripheral pixels $a_{i-1,j}$, $a_{i,j-1}$, $a_{i,j+1}$ and $a_{i+1,j}$, for example, are determined to be in correlation with the processing object pixel $a_{i,j}$, the selection means 105 outputs each of the following four differences to the first adding means 106 because it is required to average four differences of $(a_{i-1,j}-a_{i,j})$, $(a_{i,j-1}-a_{i,j})$, $(a_{i,j+1}-a_{i,j})$ and $(a_{i+1,j}-a_{i,j})$.

The first adding means 106 calculates a total sum of the outputs from the selection means 105 and inputs it into dividing means 107. The dividing means 107 calculates an average value of the differences between the peripheral pixels and the processing object pixel by dividing the total sum of the outputs from the first adding means 106 by a numeric value to be a divisor in the averaging processing, outputted from the counting means 104, e.g., in the above specific example, the divisor is "4".

Second adding means 108 adds the average value of the differences between the processing object pixel and the peripheral pixels, which is the output from the dividing means 107, to the value of the processing object pixel $a_{i,j}$ from the simultaneous processing means 101.

According to the above configuration, it is meant the average value of the processing object pixel and the peripheral pixels to be in correlation with it is calculated in the 2-D adaptive type LPF, resulting in noise reduction. This will be referred to hereafter.

Supposing $b_1$ is a value of the processing object pixel, $b_2$–$b_n$ are values of the peripheral pixels correlating with it and noise with levels $c_1$–$c_n$ are superimposed on these pixels. In addition, supposing all square average values $c^2$ of the noise levels superimposed on each pixel have the same value. It is meant an operation of an "arithmetic expression 1" is performed in this 2-D adaptive type LPF.

$$b_1 + \{(b_2-b_1) + \ldots + (b_n-b_1)\}/n \quad \text{(Arithmetic expression 1)}$$

Here, an "arithmetic expression 2" is obtained by transforming the "arithmetic expression 1".

$$\begin{aligned}b_1 + \{(b_2 - b_1) + \ldots + (b_n - b_1)\}/n &= \\ \{nb_1 + (b_2 - b_1) + \ldots + (b_n - b_1)\}/n &= \\ (b_1 + b_2 + \ldots + b_n)/n& \end{aligned} \quad \text{(Arithmetic expression 2)}$$

$$(c_1^2 + c_2^2 + \ldots + c_n^2)^{\frac{1}{2}}/n = n^{1/2c}c/n = c/n^{1/2} \quad \text{(Arithmetic expression 3)}$$

By performing an operation on the "arithmetic expression 1", i.e., the "arithmetic expression 2", the noise level becomes $1/n^{1/2}$ as shown in the "arithmetic expression 3", resulting in noise reduction.

Further, the dull-edge and detail deterioration can be reduced in this 2-D adaptive type LPF. This manner is shown in FIG. 22(a) and FIG. 22(b).

FIG. 22(a) and FIG. 22(b) show cases where the processing of the 2-D adaptive type LPF is performed at edge portions. FIG. 22(a) shows a case of a horizontal edge and FIG. 22(b) shows a case of a vertical edge.

Halftone portions in the drawing show low intensity portions 221 and the other portions show high intensity portions 222 respectively.

Now, supposing a difference between the low intensity portion 221 and the high intensity portion 222 (contrast) in the drawing is sufficiently higher than a threshold value in the correlation detectors $103_1$–$103_n$, and the noise level superimposed on each pixel is lower than the threshold value described above, in the case of FIG. 22(a), the dull-edge is not generated because five pixels $a_{i-1,j-1}$, $a_{i,j-3}$, $a_{i,j-2}$, $a_{i,j-1}$ and $a_{i+1,j-1}$ existing in the low intensity portion 221 are excluded from the averaging processing, and an average value of remaining eight pixels existing in the high intensity portion 222 is calculated.

It is the same as a case of FIG. 22(b). Further, the detail is not impaired even in the detail portion because the detail which is higher than the threshold value described above is omitted from the averaging processing.

Regarding the details having lower value than the threshold value set in the correlation detector, however, the detail deterioration is generated in the above configuration because the averaging processing is performed. This will be explained hereafter.

FIG. 23 shows frequency characteristics wherein six pixels in the front and the back of the processing object pixel $a_{i,j}$ are determined to be in correlation with it in the 2-D adaptive type LPF according to the configuration described above. Where, fsh represents a horizontal sampling frequency. As can be seen from the chart, signals lower than the threshold value set in the correlation detectors are completely suppressed in a frequency band equal to or higher than fsh/8, regardless of the noise components or the signal components.

Accordingly, if the detail with a low amplitude exists in the signal components, the deterioration becomes significant.

Additionally, since the 2-D adaptive type LPF described above has characteristics to reduce noise in a high frequency band more than noise in a low frequency band, there is a problem that noise with large grains in a low frequency band remains to be obstructive. This will be explained hereafter.

FIG. 24 shows an example of image signals S1 inputted into the 2-D adaptive type LPF. In the case of such input signals, if the threshold value set in the correlation detectors of the 2-D adaptive type LPF is 3, $a_{i,j-3}$ and $a_{i,j+3}$ out of the six pixels in the front and the back of the processing object pixel $a_{i,j}$ are omitted from the averaging processing because the differences between the pixels $a_{i,j-3}$ and $a_{i,j+3}$ and the processing objective pixel become 5 and 4 respectively, consequently the averaging processing is performed using four pixels in the front and the back of the processing object pixel $a_{i,j}$.

Now, the frequency characteristics in this case are represented in FIG. 25. It is understood from the chart that the noise levels in a low frequency band around fsh/8 are not much suppressed when compared to the frequency characteristics wherein the forward and backward six pixels are determined to be in correlation, and a degree of noise reduction within this frequency band becomes lower.

Accordingly, the conventional 2-D adaptive type LPF has the characteristics wherein the noise in a low frequency band is reduced only when there are close correlations with peripheral pixels around the processing object pixel, so that the noise in a low frequency band is easy to remain, further, there is a problem that grains of noise in a low frequency band are larger than those in a high frequency band, resulting in obstruction.

SUMMARY OF THE INVENTION

It is an object of the present invention to provide a noise reduction apparatus, a noise reduction method, a medium and a program, capable of efficiently reducing noise in a low frequency band which is visually conspicuous, and minimizing detail deterioration with a low amplitude, in consideration of such problems in a conventional noise reduction apparatus described above.

One aspect of the present invention is the noise reduction apparatus, comprising:

simultaneous processing means of allowing to simultaneously processing image signals of a portion containing a noise processing object pixel to be inputted, wherein (a) the image signals are existing in spatially different locations, or (b) the image signals are contained in fields or frames at different times in terms of time;

filter operation means of performing filter operations with respect to outputs of the simultaneous processing means;

noise components extraction means of extracting noise components based upon outputs of the filter operation means; and noise attenuation means of attenuating noise using outputs of the noise components extraction means with respect to the noise processing object pixel within the outputs of the simultaneous processing means.

Another aspect invention of the present invention is the noise reduction apparatus, wherein the filter operation means performs low pass filter type operations.

According to the present invention, for example, considerably conspicuous noise as visual characteristics in a low frequency band can be effectively reduced since input signals into noise extraction means have been performed with the LPF processing, further, the detail deterioration with a low amplitude can be suppressed when compared to the conventional manner since signals having a high frequency band remain when compared to the conventional manner. Furthermore, since simultaneous processing means to be required for noise extraction also serves as the simultaneous processing means required for filter operation means, a circuit scale can be suppressed smaller when compared to a case where it does not serve as the above.

Still another aspect of the present invention is the noise reduction apparatus, further comprising detail enhancement means of generating detail enhancement signals based upon the outputs of the simultaneous processing means and adding the signals to the outputs of the noise attenuation means.

According to the present invention, for example, the detail deterioration can be more improved by the noise reduction apparatus of the third invention rather than that of the first and the second invention since the processing for restoring details deteriorated to some extent by the noise reduction processing is performed. Further, a circuit scale required for the improvement of the detail deterioration is minimized since the simultaneous processing means required for the detail enhancement also serves as the simultaneous processing means in the noise reduction apparatus.

Yet still another aspect of the present invention is the noise reduction apparatus, wherein the simultaneous processing means comprises means of allowing to simultaneously processing the image signals existing in spatially different locations, and contained in a plurality of lines configuring images in fields or frames at a same time, and wherein the noise components extraction means comprises:

(a) signal block forming means of forming a signal block consisting of a plurality of pixels based upon the output of the filter operation means;

(b) a plurality of subtracting means of calculating differences between an object pixel located at the same spatial location as the noise processing object pixel within a plurality of pixels forming the signal block and a plurality of peripheral pixels located around the periphery of the object pixel respectively;

(c) a plurality of comparators of comparing outputs of a plurality of the subtracting means with a predetermined level and outputting the comparison result signals;

(d) counting means of counting the number of comparison result signals showing a lower level than the predetermined level out of outputs of a plurality of the comparators, and outputting signals showing the counting results and signals specifying a subtractor outputting the lower value than the predetermined value out of a plurality of the subtractors respectively;

(e) selection means of selecting and outputting only outputs specified by the output of the counting means out of the outputs of a plurality of the subtracting means;

(f) adding means of adding a plurality of outputs of the selection means; and (g) Dividing means of dividing an output of the adding means by the output of the counting means.

According to the present invention, noise which is considerably conspicuous as visual characteristics in a low frequency band can be effectively reduced since input signals to noise extraction means have been performed with the LPF processing, further, the detail deterioration with a low amplitude can be suppressed when compared to the conventional manner since signals having a high frequency band remain when compared to the conventional manner. Furthermore, since simultaneous processing means to be required for noise extraction also serves as the simultaneous processing means required for filter operation means, a circuit scale can be suppressed smaller when compared to a case where it does not serve as the above. In addition, if detail enhancement manner is comprised, the detail deterioration can be further improved since the processing for restoring details deteriorated to some extent by the noise reduction processing is performed.

Still yet another aspect of the present invention is the noise reduction apparatus, wherein the simultaneous processing means comprises means of allowing to simultaneously processing image signals contained in fields or frames at different times in terms of time, and wherein the noise components extraction means, comprising:

(a) signal block forming means of forming a signal block consisting of a plurality of pixels based upon the output of the filter operation means;

(b) a plurality of subtracting means of calculating differences between an object pixel located at the same location as the noise processing object pixel in terms of time and space within a plurality of pixels forming the signal block and a plurality of peripheral pixels located around the periphery of the object pixel in terms of time and space respectively;

(c) a plurality of comparators of comparing outputs of a plurality of the subtracting means with a predetermined level and outputting comparison result signals;

(d) counting means of counting the number of comparison result signals showing a lower level than the predetermined level out of the outputs of a plurality of comparators, and outputting signals showing the results and signals specifying a subtractor outputting the lower value than the predetermined value out of a plurality of the subtractors respectively;

(e) selection means of selecting and outputting only outputs specified by the output of the counting means out of a plurality of the subtracting means;

(f) adding means of adding a plurality of outputs of the selection means; and (g) Dividing means of dividing an output of the adding means by the output of the counting means.

According to the present invention, visually conspicuous noise in a low frequency band in terms of time can be effectively reduced since input signals to the noise extraction means have been performed with the LPF processing in terms of time and space. Further, since simultaneous processing means to be required for the noise extraction also serves as the simultaneous processing means required for the filter operation means, a circuit scale can be suppressed smaller when compared to a case where it does not serve as the above. In addition, if detail enhancement means is comprised, the detail deterioration can be further improved since the processing for restoring details deteriorated to some extent by the noise reduction processing is performed.

A still further aspect of the present invention is the noise reduction apparatus, wherein the noise components extraction means further comprises numeric value generation means of generating a value according to the counting result from the counting means, and wherein the dividing means divides the output of the adding means by the output of the numeric value generation means instead of the output of the counting means.

A still further aspect of the present invention is the noise reduction apparatus, wherein Input/output characteristics of the numeric value generation means outputs (a) a maximum power of 2 not exceeding a value meant by the input signals when the value meant by the input signals is not a power of 2, or (b) a minimum power of 2 exceeding a value meant by input signals when the value meant by the input signals is equal to the number of pixels forming the signal block.

According to the present invention, it is possible to reduce a circuit scale smaller since the divider becomes very simple circuit just performing a bit shift operation.

A yet further aspect of the present invention is a noise reduction method, comprising:

simultaneous processing step of allowing to simultaneously processing image signals of a portion containing a noise processing object pixel to be inputted, wherein (a) the image signals are existing in spatially different locations, or (b) the image signals are contained in fields or frames at different times in terms of time;

filter operation step of performing filter operations with respect to outputs of the simultaneous processing means;

noise components extraction step of extracting noise components based upon outputs of the filter operation step; and noise attenuation step of attenuating noise using outputs of the noise components extraction step with respect to the noise processing object pixel within the outputs of the simultaneous processing step.

A still yet further aspect of the present invention is a program for operating a computer, comprising:

simultaneous processing means of allowing simultaneously processing image signals of a portion containing a noise processing object pixel to be inputted, wherein (a) the image signals are exiting in spatially different locations, or (b) the image signals are contained in fields or frames at different times in terms of time;

filter operation means of performing filter operations with respect to outputs of the simultaneous processing means;

noise components extraction means of extracting noise components based upon outputs of the filter operation means; and, noise attenuation means of attenuating the noise using outputs of the noise components extraction means with respect to the noise processing object pixel within the outputs of the simultaneous processing means.

An additional aspect of the present invention is a program for a computer to execute, comprising:

simultaneous processing step of allowing to simultaneously processing image signals of a portion containing a noise processing object pixel to be inputted wherein (a) the image signals are existing in spatially different locations, or (b) the image signals are contained in fields or frames at different times in terms of time;

filter operation step of performing filter operations with respect to outputs of the simultaneous processing means;

noise components extraction step of extracting noise components based upon outputs of the filter operation step; and noise attenuation step of attenuating the noise using outputs of the noise components extraction step with respect to the noise processing object pixel within the outputs of the simultaneous processing step.

A still additional aspect of the present invention is a medium having the program, wherein the medium is characterized in being processable by a computer.

BRIEF DESCRIPTION OF THE DRAWINGS

FIG. 10 is a list showing one example of an input/output relationship of numeric value generation means used for the second preferred embodiment;

Figure 1:
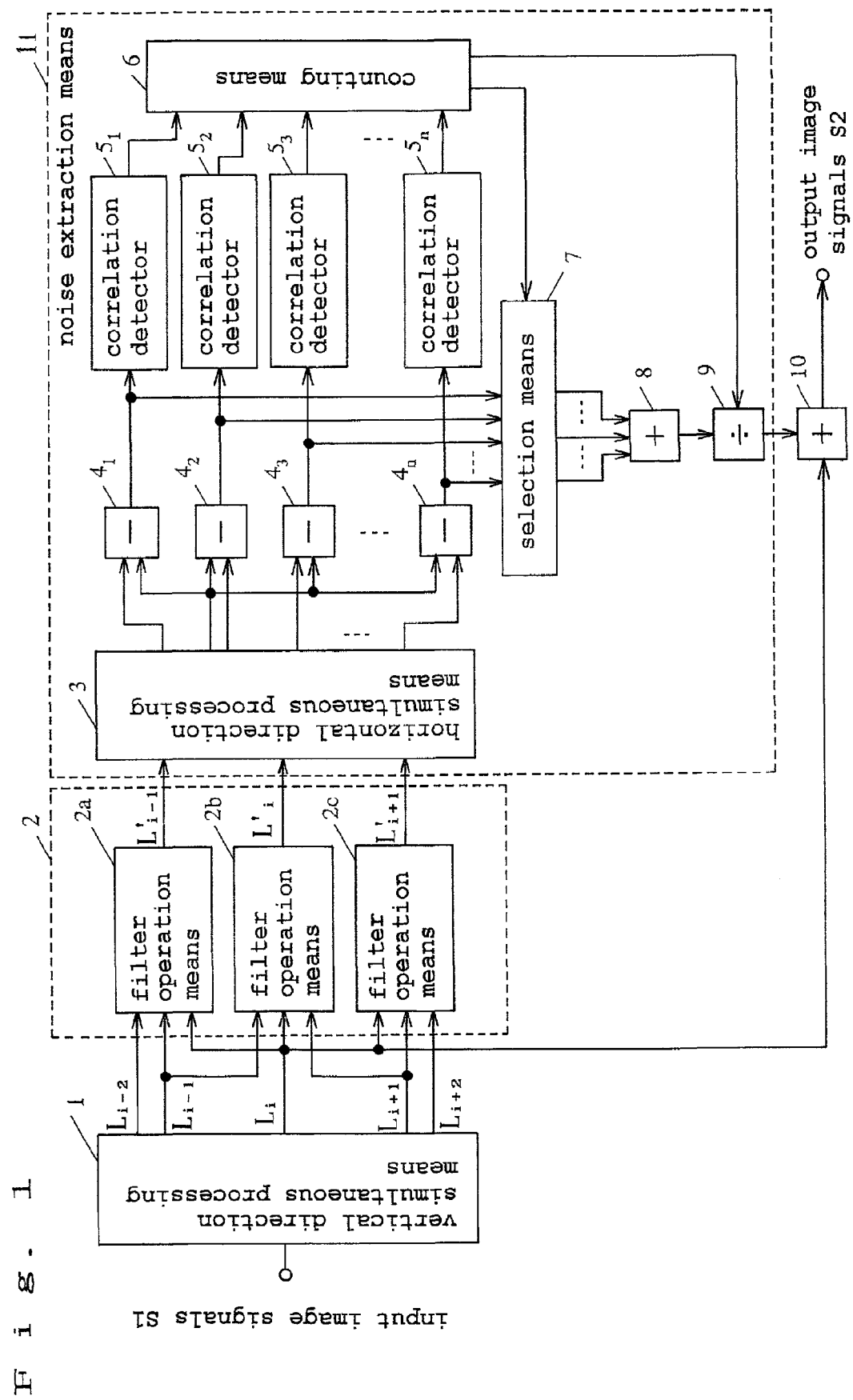
FIG. 1 is a block diagram showing a configuration of a noise reduction apparatus of a first preferred embodiment according to the present invention.

DESCRIPTION OF SYMBOLS 1 vertical direction simultaneous processing means
2 filter operation means
3 horizontal direction simultaneous processing means
6 counting means
7 selection means
10 adder
11 noise extraction means
12 numeric value generation means
13 detail enhancement means
21a–21d 1H delay elements
31a–31d adders
32a–32d multipliers
33a and 33b shift-left operators
34a and 34b shift-right operators
35a and 35b 1T delay elements
36 constant value generator
37a and 37b subtractors
41a–41o 1T delay elements
51 time direction simultaneous processing means
52 3-D filter operation means
53 horizontal-vertical direction simultaneous processing means
61a–61d field memories
71 vertical HPF
72 horizontal HPF
74a and 74b coring circuits

PREFERRED EMBODIMENTS OF THE INVENTION

Preferred embodiments of the present invention will be explained referring to the accompanying drawings hereinafter.

First Preferred Embodiment

FIG. 1 shows a block diagram illustrating a basic feature configuration of a noise reduction apparatus of the first preferred embodiment according to the present invention.

In FIG. 1, reference numeral 1 designates vertical direction simultaneous processing means as simultaneous processing means of simultaneously outputting a plurality of lines at the same time with respect to input image signals S1. Reference numeral 2 designates filter operation means of performing filter operations with respect to the outputs of the vertical direction simultaneous processing means 1. Reference numeral 11 designates noise components extraction means of extracting noise components based upon the outputs of the filter operation means 2. Reference numeral 10 designates an adder as noise reduction means of adding a processing object pixel for noise reduction located in a specific location out of the vertical direction simultaneous processing means 1 to an output of the noise components extraction means 11.

Incidentally, the simultaneous processing means hereby is means that allows simultaneous process of image signals located in spatially different locations.

Where the filter operation means 2 comprises three filter operation means 2a–2c, each of which performs the filter operation using three lines out of the outputs of the vertical direction simultaneous processing means 1.

Major features of the preferred embodiments are as follows.

That is to say, in the filter operation means 2, when the image signals containing both the noise components in a low frequency band and the noise components in a high frequency band are inputted, the noise components in a high frequency band are mainly suppressed, the noise components in a low frequency band being left without being processed are outputted to the next stage. In addition, there is the feature that the visually conspicuous noise in a low frequency band can be more effectively reduced in the noise extraction means 11 described hereafter, since a threshold value can be set higher when compared to the conventional manner.

In addition, the noise components extraction means 11 comprises (1) horizontal direction simultaneous processing means 3 as block formation means of forming and outputting a signal block with respect to the outputs of the filter operation means 2 (2) subtractors $4_1$–$4_n$ as subtracting means of obtaining differences between a pixel located in the specific location of the horizontal direction simultaneous processing means 3 and pixels excluding it, (3) correlation detectors $5_1$–$5_n$ as comparators for comparing the outputs from the subtractors $4_1$–$4_n$ with a predetermined level and outputting comparison result signals, (4) counting means 6 for counting the number of comparison result signals showing a lower value than the predetermined value out of the outputs of the correlation detectors $5_1$–$5_n$, and outputting signals showing the counting result and signals to specify the subtractor which outputs the lower value than the predetermines level out of subtracters $4_1$–$4_n$ respectively, (5) selection means 7 of selecting only signals specified by the counting means 6 out of the outputs of the $4_1$–$4_n$, (6) an adder 8 as adding means of adding a plurality of outputs of the selection means 7, and (7) a divider 9 as dividing means of dividing the outputs of the adder 8 by the outputs of counting means 6. The divided result by the divider 9 is outputted to the adder 10.

The operation of the noise reduction apparatus of the first preferred embodiment will be explained referring to drawings and a preferred embodiments of a noise reduction method of the present invention will be referred to as well.

Figure 2:
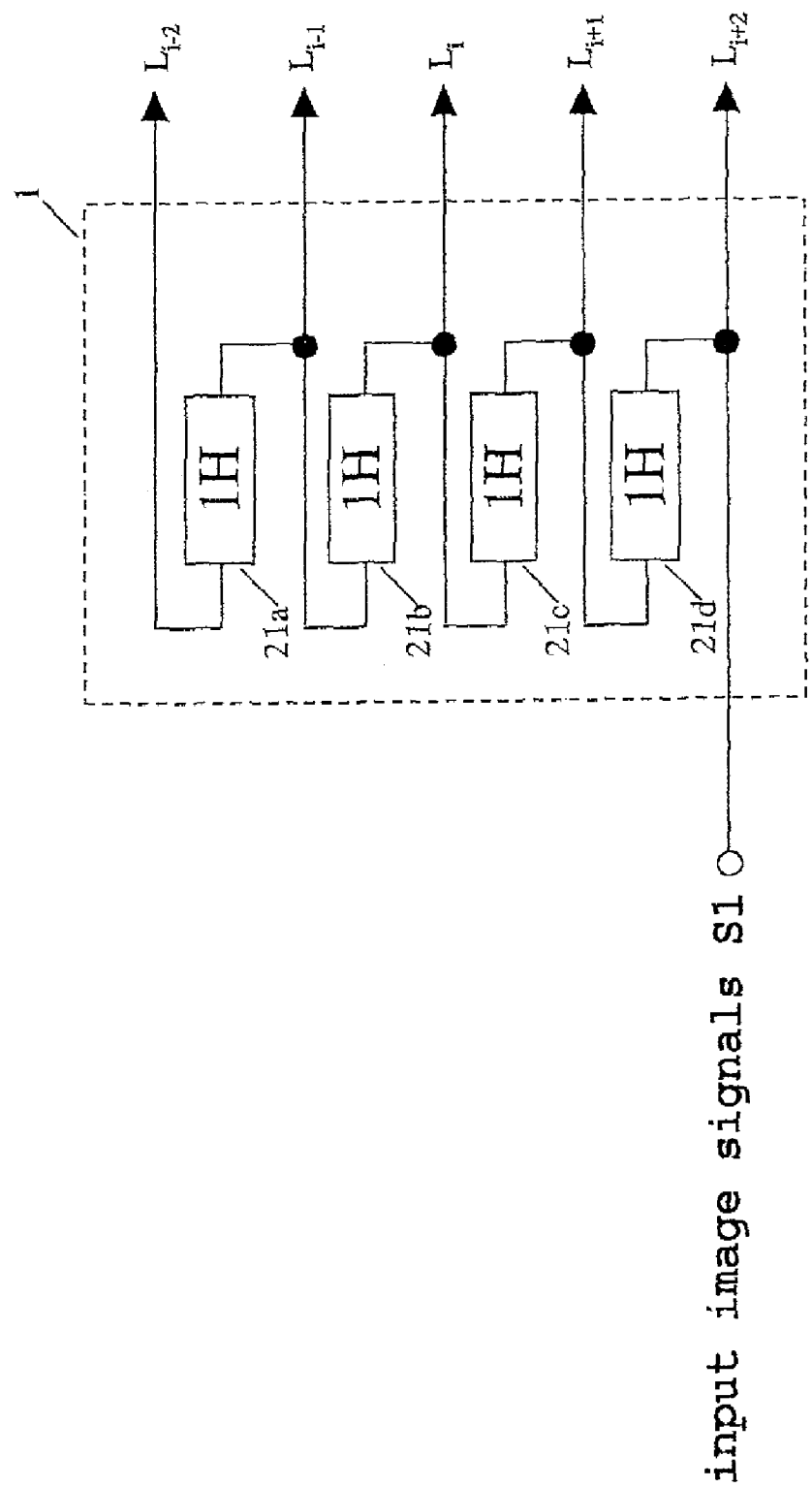
FIG. 2 is a block diagram showing a configuration example of vertical direction simultaneous processing means used for the first preferred embodiment.

At first, the vertical direction simultaneous processing means 1 simultaneously processes sequential five lines containing a noise reduction processing object pixel with respect to the image signals inputted from the signal terminal Si and outputs them. FIG. 2 is a block diagram showing one example of the vertical direction simultaneous processing means 1, where, 21a–21d are 1H delay elements. In this case, five lines from $L_{i-2}$ to $L_{i+2}$ are simultaneously processed with respect to the input signals and outputted.

Then, the filter operation means 2a–2c perform LPF (Low Pass Filter) operations with the outputs $L_{i-2}$–$L_{i+2}$ from the vertical direction simultaneous processing means 1 in the horizontal and the vertical directions, and consequently output $L'_{i-1}$, $L'_i$, $L'_{i+1}$ to the noise components extraction means 11 of the next stage.

Figure 3:
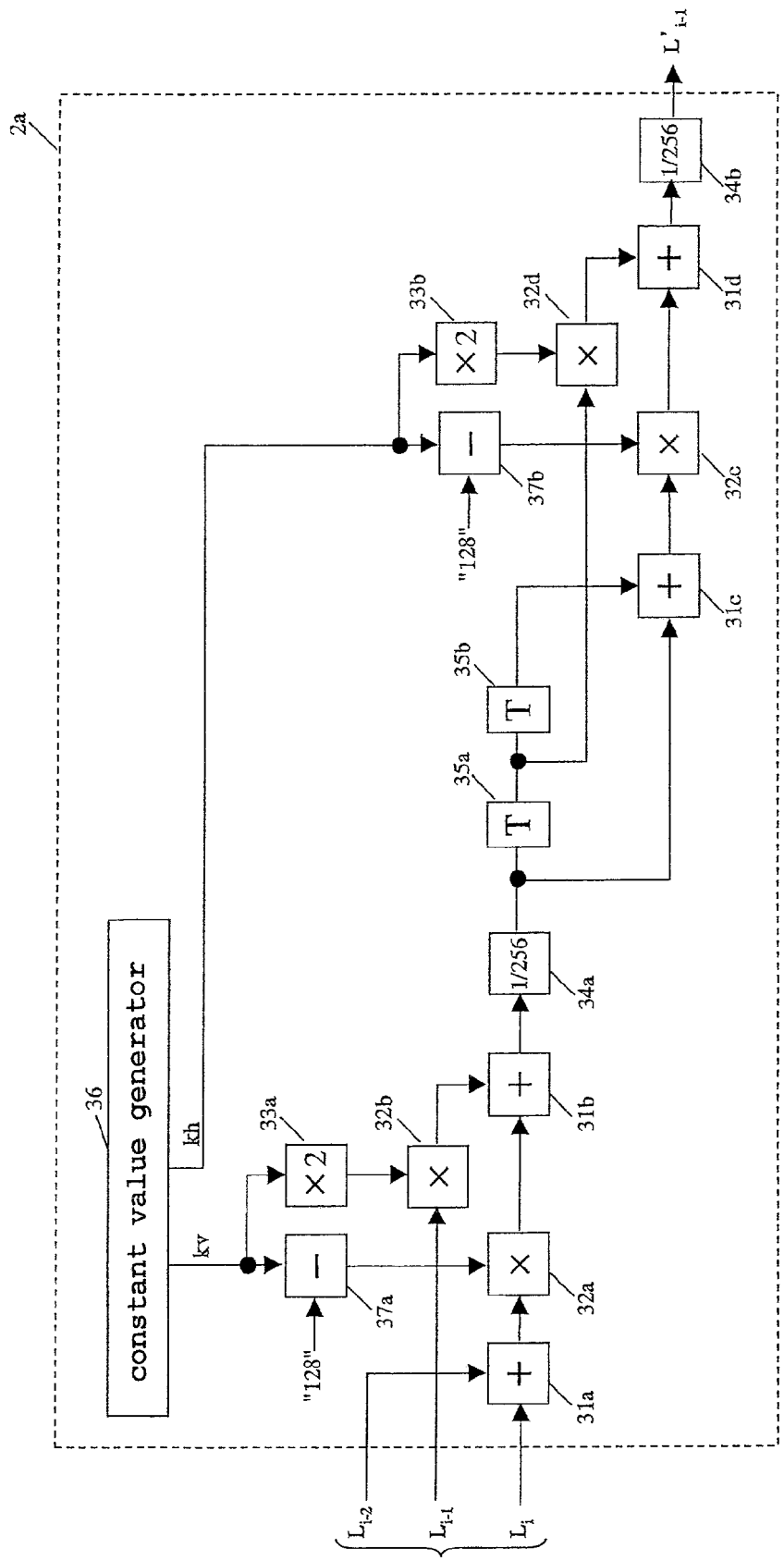
FIG. 3 is a block diagram showing a configuration example of filter operation means used for the first preferred embodiment.

FIG. 3 is a block diagram showing one example of the filter operation means 2a. Where, reference numerals 31a–31d represent adders and reference numerals 32a–32d represent multipliers. Reference numerals 33a and 33b represent shift-left operators for shifting one bit to the left and outputting values having two times of the input values, and reference numerals 34a and 34b represent shift-right operators for shifting 8 bits to the right and outputting values of 1/256 times of the input values. Reference numerals 35a and 35b represent 1T delay elements. Reference numeral 36 represents a constant value generator for outputting a constant kv to a subtractor 37a and the shift-left operator 33a, and a constant kh to a subtractor 37b and the shift-left operator 33b. Reference numerals 37a and 37b represent subtractors for subtracting the constants kv and kh generated by the constant value generator from a constant value 128, and outputting the results to the multipliers 32a and 32c respectively. Filter operation means 2b and 2c have the same configurations as well.

$$Hv(z)=\{(128-kv)\times(1+z^{-2})+2kv\times z^{-1}\}/256 \quad \text{(Arithmetic expression 4)}$$

$$Hh(z)=\{(128-kh)\times(1+z^{-2})+2kh\times z^{-1}\}/256 \quad \text{(Arithmetic expression 5)}$$

According to the configuration like this, the filter operations on the transfer function are performed in the vertical direction using the "arithmetic expression 4" and in the horizontal direction using the "arithmetic expression 5".

Frequency characteristics of the filter operation means 2a–2c are shown in FIG. 4(a) and FIG. 4(b) when the constant value generator 36 generate kv=kh=64. FIG. 4(a) represents horizontal direction characteristics and FIG. 4(b) represents vertical direction characteristics. In this case, the outputs $L'_{i-1}$, $L'_i$, $L'_{i+1}$ of the filter operation means 2a–2c are outputted to the next stage by being suppressed in a high frequency band higher than fsh/4 and fsv/4.

Figure 5:
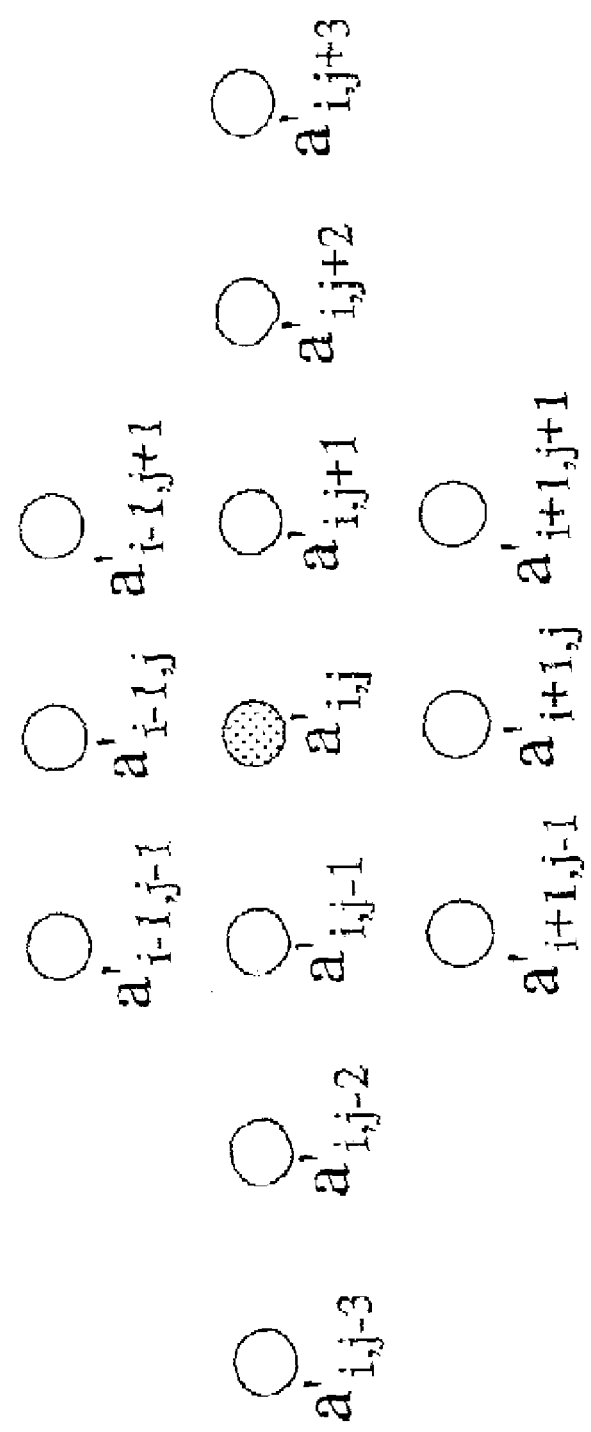
FIG. 5 is a schematic diagram showing one example of a signal block formed by horizontal direction simultaneous processing means used for the first preferred embodiment.

Then, the horizontal direction simultaneous processing means 3 configures a 2-D signal block consisting of a plurality of pixels as shown in FIG. 5 based upon the outputs $L'_{i-1}$, $L'_i$, $L'_{i+1}$ of the filter operation means 2a–2c.

Figure 6:
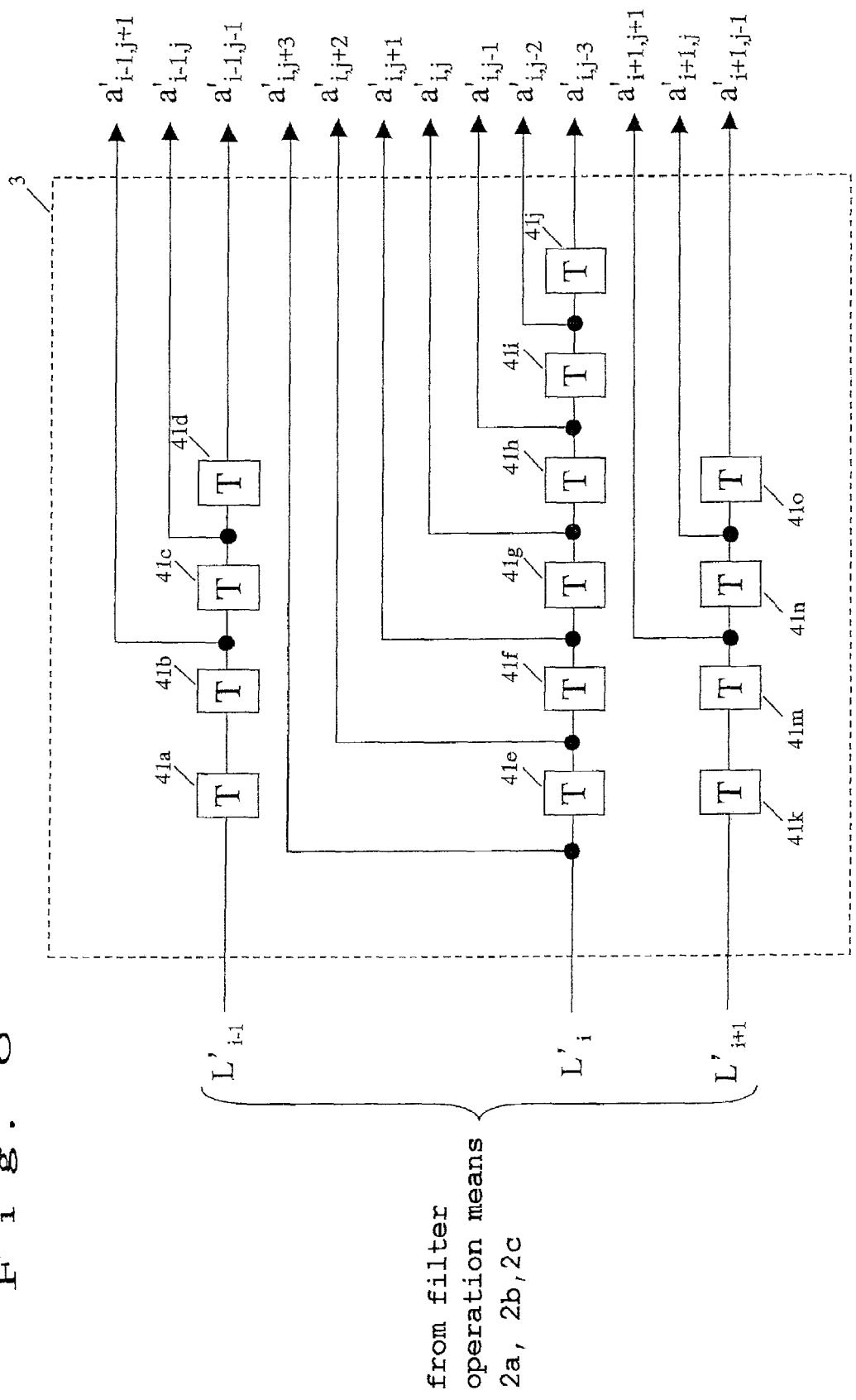
FIG. 6 is a block diagram showing a configuration example of the horizontal direction simultaneous processing means used for the first preferred embodiment.
Figure 20:
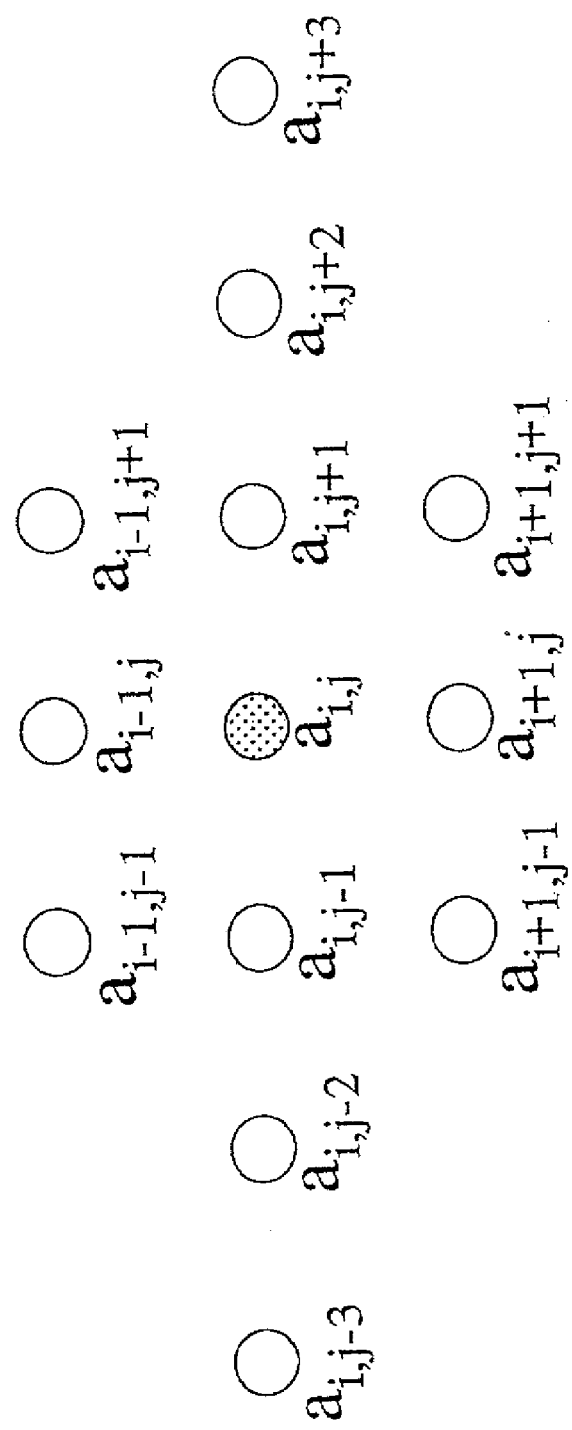
FIG. 20 is a schematic diagram showing an example of a signal block formed by simultaneous processing means used for the noise reduction circuit in the art.
Figure 21:
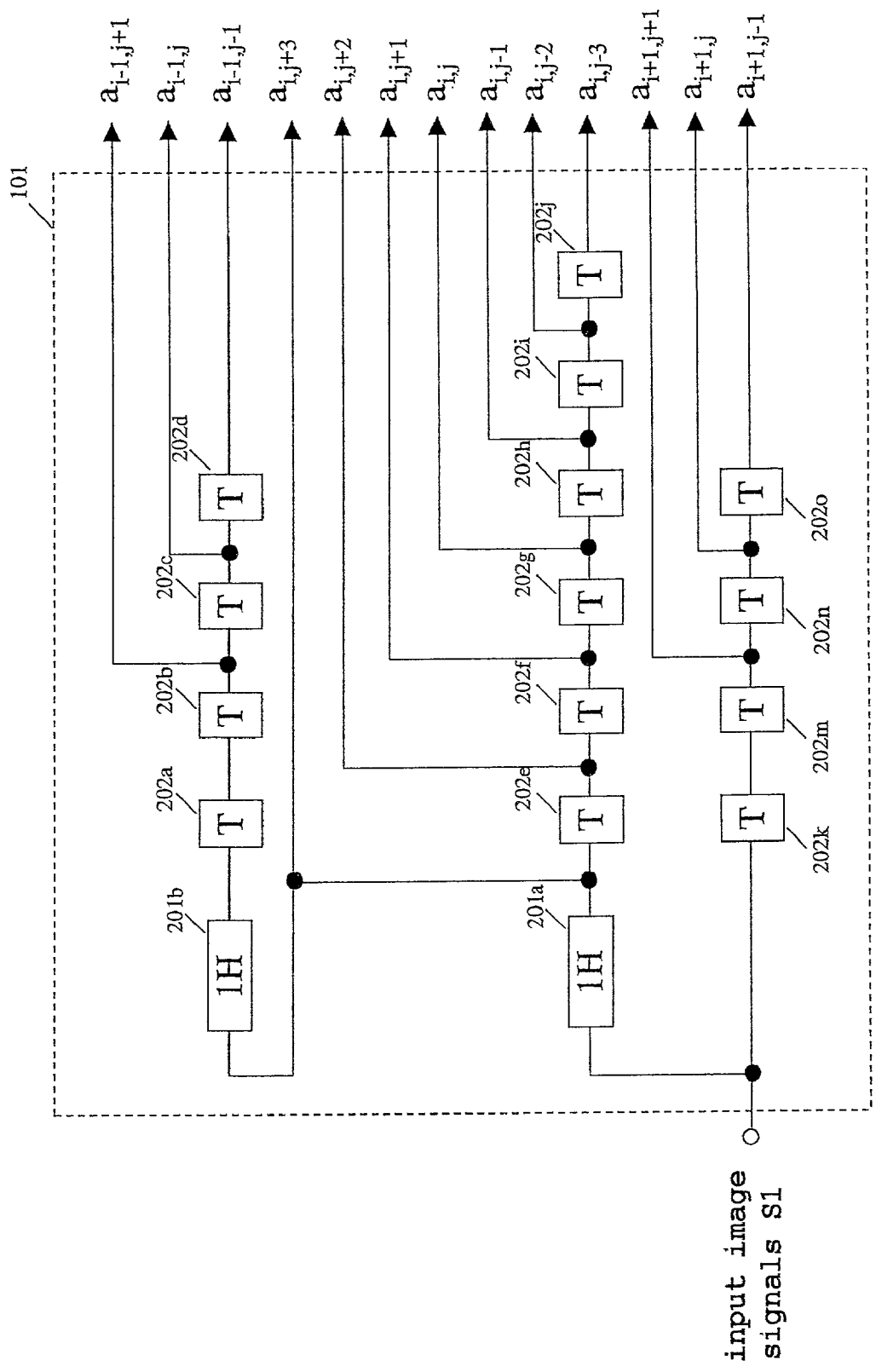
FIG. 21 is a block diagram showing a configuration example of the simultaneous processing means used for the noise reduction circuit in the art.
Figure 22A:
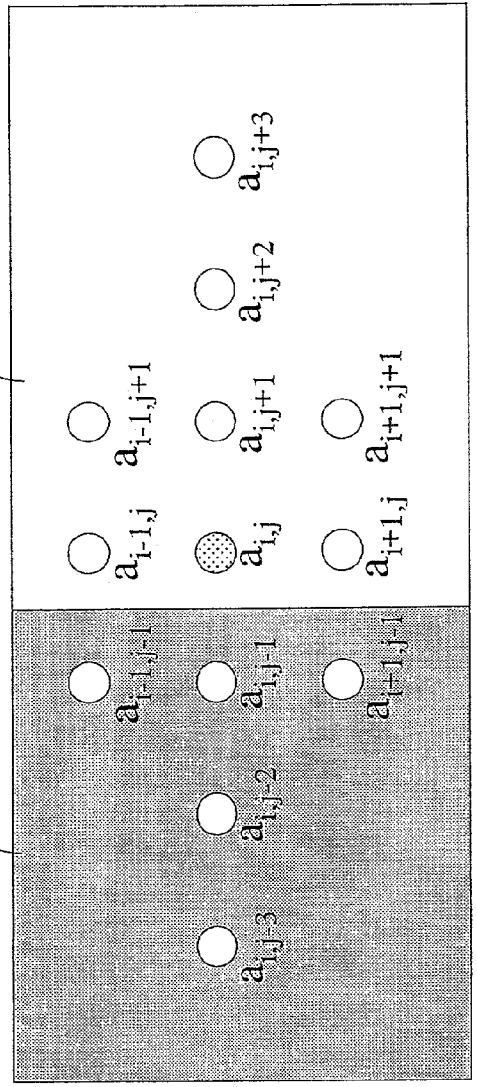
FIG. 22(a) and FIG. 22(b) are schematic diagrams explaining operations of the noise reduction circuits in the art.
Figure 22B:
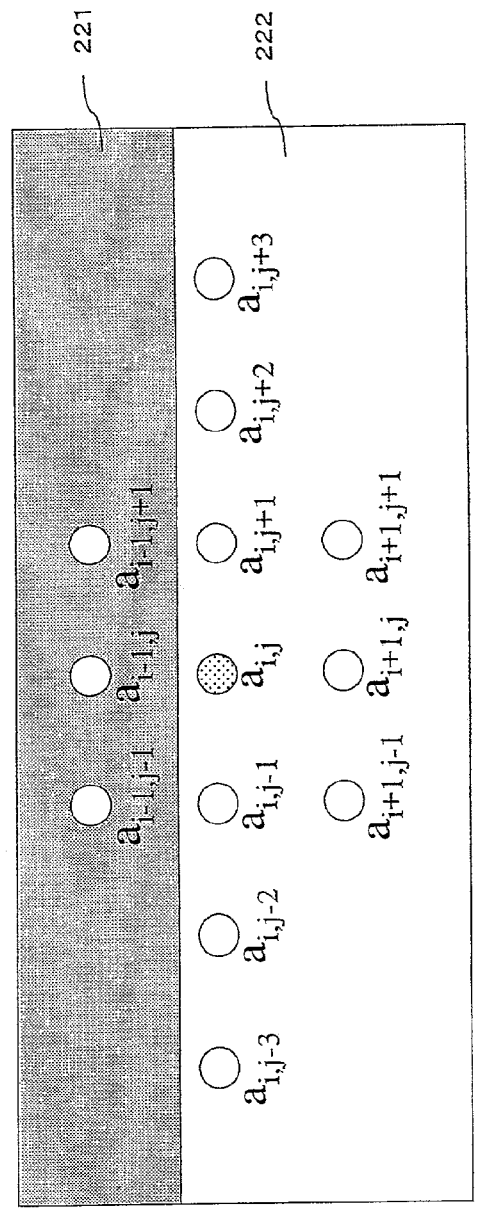

FIG. 5 shows a case where the signal block consists of 13 pixels, just as the case with FIG. 20, wherein $a_{i,j}$ is called a processing object pixel for noise extraction and pixels excluding the $a_{i,j}$ are called peripheral pixels. One example of the horizontal simultaneous processing means required for forming the signal block in FIG. 5 is shown in FIG. 6. In FIG. 6, reference numerals 41a–41o represent 1T delay elements.

Then, the subtractors $4_1$–$4_n$ (in the case of the signal block in FIG. 5, n=12) output difference obtained after substracting a value of the processing object pixel $a'_{i,j}$ for noise extraction from the values of the peripheral pixels excluding the processing object pixel $a'_{i,j}$ for noise extraction in FIG. 5.

Then, the correlation detectors $5_1$–$5_n$ compare the output values from the subtractors $4_1$–$4_n$ with a pregiven threshold value, and if the output value is less than the threshold value, the correlation detector outputs a level "1" when determined that there is a correlation between the processing object pixel $a'_{i,j}$ for noise extraction and the peripheral pixel excluding the processing object pixel $a'_{i,j}$ for noise extraction, if not, outputs a level "0".

Then, the counting means 6 counts the number of "1"s appeared in the outputs of the correlation detectors $5_1$–$5_n$, i.e., the number of peripheral pixels determined to be in correlation with the processing object pixel $a'_{i,j}$ for noise extraction, and outputs the value as a numeric value to be a divisor in the average value processing. In addition, the counting means 6 outputs location information about the peripheral pixels determined to be in correlation with the processing object pixel $a'_{i,j}$ for noise extraction as well.

Further, the selection means 7 selects all the differences between the peripheral pixels determined to be in correlation with the processing object pixel for noise extraction and the processing object pixel $a'_{i,j}$ for noise extraction out of the outputs of the subtracting means $4_1$–$4_n$ according to the location information about the peripheral pixels determined to be in correlation with the processing object pixel $a'_{i,j}$ for noise extraction outputted from the counting means 6, and outputs them to the adder 8 without being processed.

The adder 8 calculates a total sum of the outputs from the selection means 7 to input into dividing means 9. The divider 9 calculates an average value of differences between the processing object pixel $a'_{i,j}$ for noise extraction and the peripheral pixels by dividing the total sum of the outputs of the adder 8 by a numeric value to be a divisor, which is the output from the counting means 6, of the averaging processing.

In addition, the adder 10 adds a value of a pixel $y_{i,j}$ which has the same spatial location as the processing object pixel $a'_{i,j}$ for noise extraction out of the outputs $L_i$ of the vertical direction simultaneous processing means 1 to the average value, which is the output of the divider 9, of differences between the processing object pixel $a'_{i,j}$ for noise extraction and the peripheral pixels, and outputs the result as output image signals S2.

On the basis of the operations described above, the noise reduction apparatus of the preferred embodiment effectively performs the noise reduction processing with respect to noise in a low frequency band This will be referred to hereafter.

Supposing $b'_1$ is a value of the processing object pixel $a'_{i,j}$ for noise extraction, $b'_2$–$b'_n$ are values of the peripheral pixels having the correlations and the noise is superimposed on these pixels.

$$b'_1+\{(b'_2-b'_1)+\ldots+(b'_n-b'_1)\}/n \quad \text{(Arithmetic expression 6)}$$

Supposing a configuration is different from the above and the adder 10 adds a value of the processing object pixel $a'_{i,j}$ for noise extraction from the vertical direction simultaneous processing means 3 to an average value of the differences, which is the output of the dividing means 9, between the processing object pixel $a'_{i,j}$ for noise extraction and the peripheral pixels, it is meant that an operation on the "arithmetic expression 6" is performed in that configuration.

The "arithmetic expression 6" means that, based upon the same consideration as the 2-D adaptive type LPF in the art, the noise reduction is performed with respect to the processing object pixel $a'_{i,j}$ for noise extraction by the averaging processing of the processing object pixel for noise extraction and the peripheral pixels to be in correlation with it.

In addition, it may also be said that the term in the braces { } of the "arithmetic expression 6" represents the extraction of the noise components since the noise reduction is performed by adding the terms in the braces { } to the value of the processing object pixel $a'_{i,j}$ for noise extraction in the "arithmetic expression 6".

The signal components and the noise components in a high frequency band are both suppressed as shown in FIG. 4(a) and FIG. 4(b) because the processing object pixel $a'_{i,j}$ for noise extraction and the peripheral pixels are signals after the LPF processing by the filter operation means 2 hereby.

Accordingly, concerning the noise reduction processing performed on the "arithmetic expression 6", the noise in a low frequency band is mainly extracted and the noise reduction is achieved based upon it.

In a practical configuration, the adder 10 does not use the value of the processing object pixel $a'_{i,j}$ for noise extraction but uses a value d of $y_{i,j}$, which has the same spatial location as it, and is a pixel before the LPF processing by the filter operation means 2.

Accordingly, it is meant the noise in a low frequency band is to be reduced with respect to the input image signals S1. The noise in a high frequency band remains to some extent, but the detail deterioration with a low amplitude is accordingly suppressed when compared to the 2-D adaptive type LPF in the art.

A higher value can be set as the threshold value in the correlation detectors $5_1$–$5_n$ when compared to the value in the conventional manner since the detail deterioration with a low amplitude is suppressed, consequently, the noise with a high amplitude in a low frequency band can also be reduced.

In addition, the 2-D adaptive type LPF in the art has characteristics that noise in a low frequency band is reduced only when there are close correlations with the periphery of the processing object pixel, but that is relieved with respect to this configuration. This will be referred to hereafter.

Figure 7:
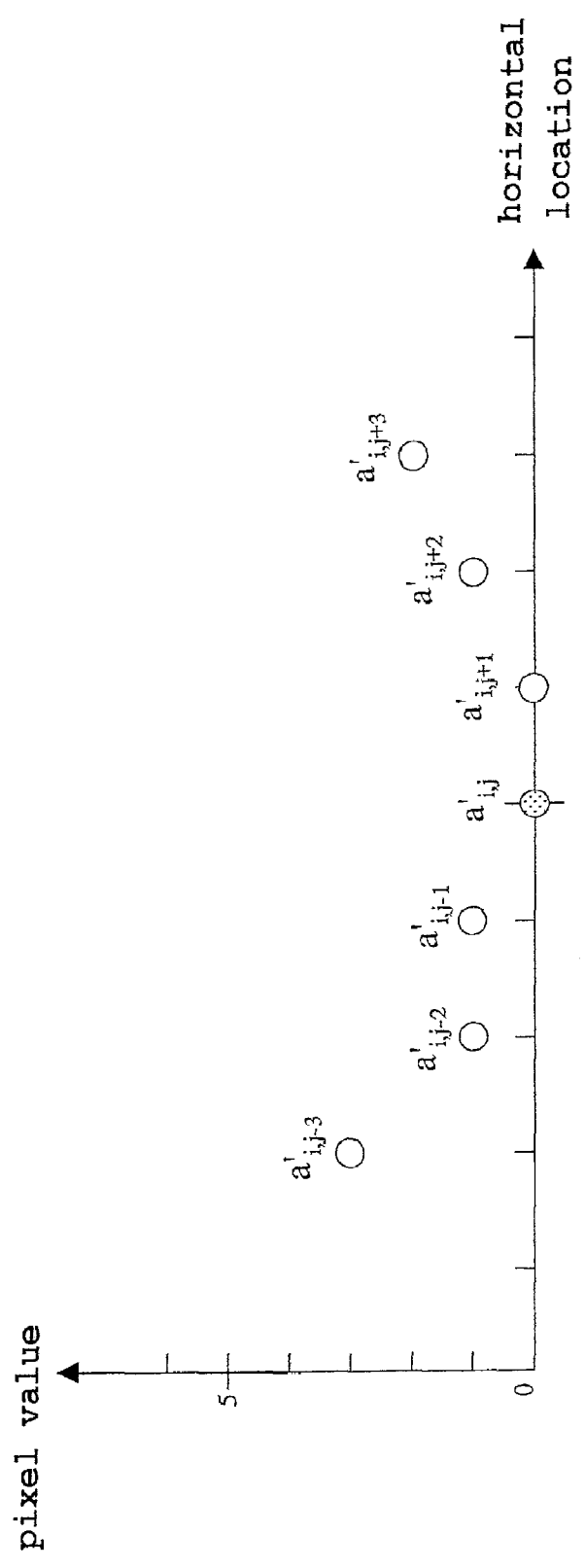
FIG. 7 is a schematic diagram showing one example of outputs of the filter operation means used for the first preferred embodiment.
Figure 24:
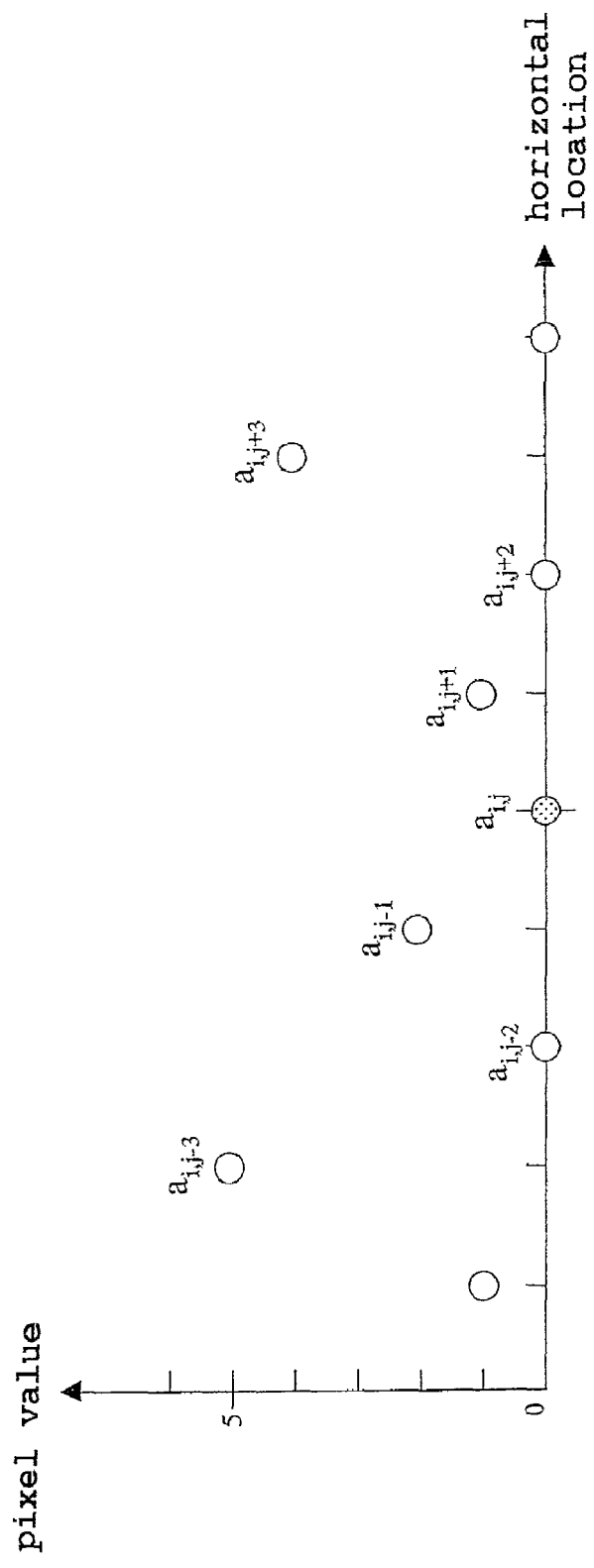
FIG. 24 is a schematic diagram showing one example of signals inputted into the noise reduction circuit in the art and of the preferred embodiment in the present invention.
Figure 25:
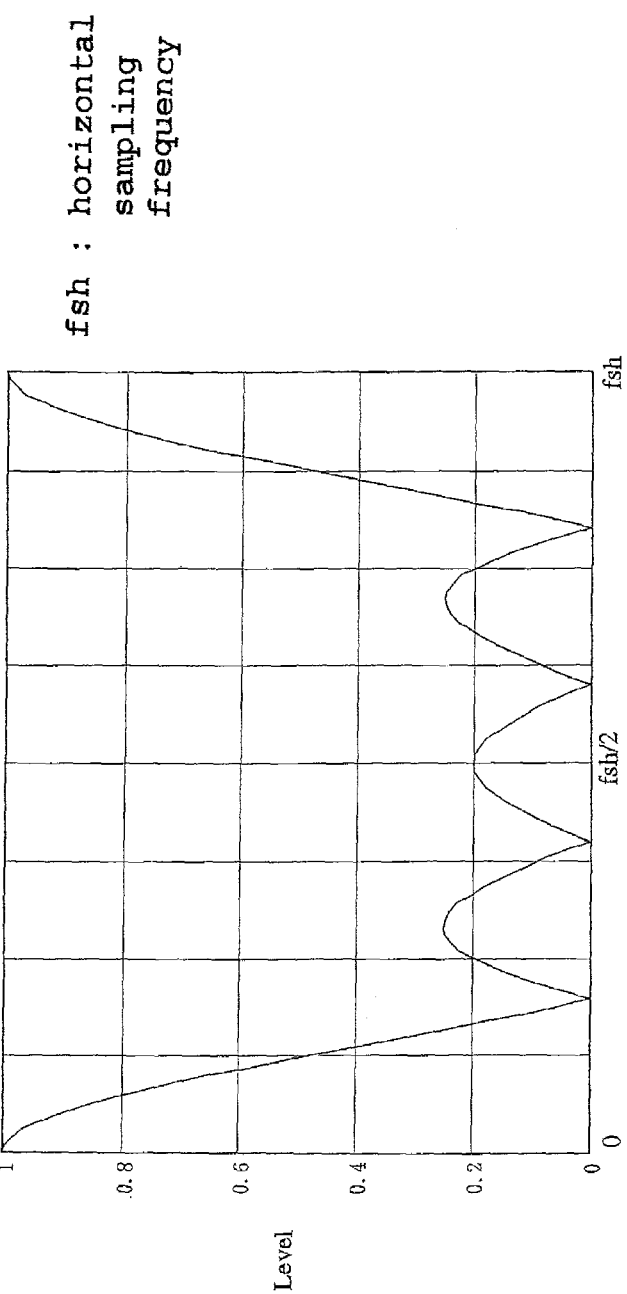
FIG. 25 is a frequency characteristics chart showing one example of frequency characteristics of the noise reduction circuit in the art.

Supposing image signals shown in FIG. 24 are inputted as the image signals S1, the averaging processing is performed using four pixels in the front and the back of the processing object pixel $a_{i,j}$ as previously discussed when the threshold value in the 2-D adaptive type LPF in the art is set 3 in the correlation detector. On the other hand, regarding this configuration when the same signals are inputted, supposing the input signals are uniform in the vertical direction for simplification of the discussion, the values of the processing object pixel $a'_{i,j}$ for noise extraction and the pixels in the front and the back of it are obtained as shown in FIG. 7 because the filter operation means 2 performs the LPF processing.

Figure 23:
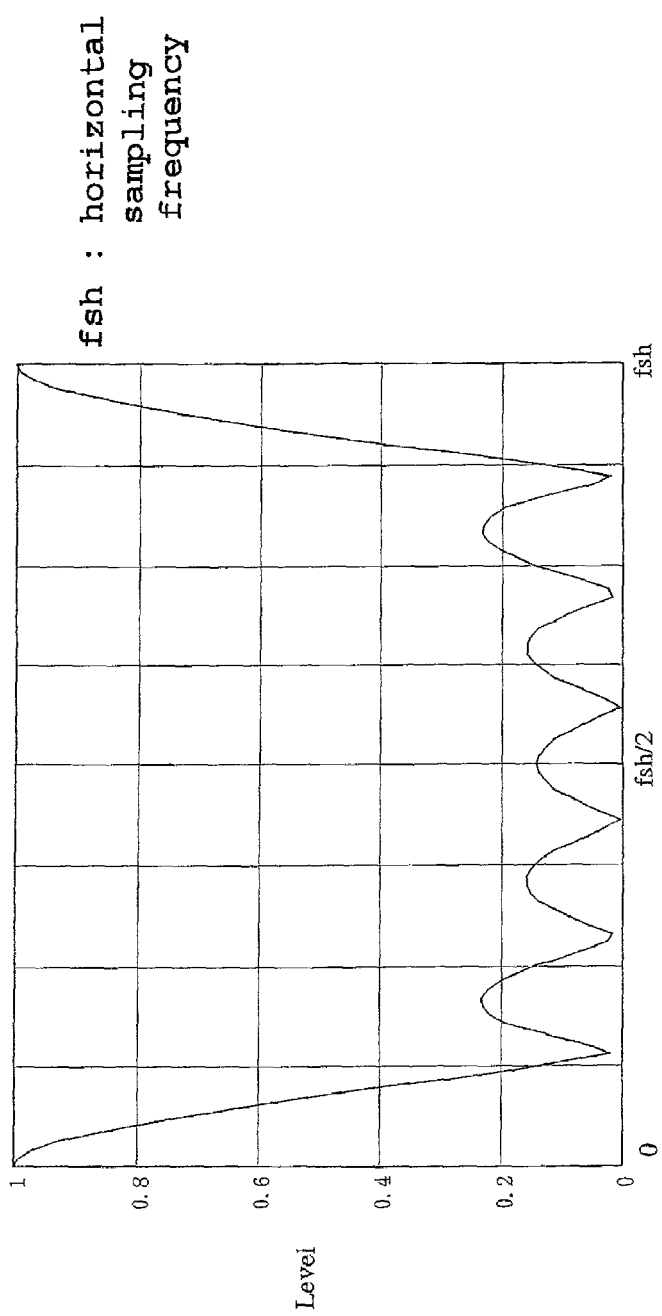
FIG. 23 is a frequency characteristics chart showing an example of frequency characteristics of the noise reduction circuit in the art and of the preferred embodiment in the present invention.

Therefore, the averaging processing is performed using six pixels in the front and the back of the processing object pixel $a'_{i,j}$ for noise extraction. A frequency characteristics in this case is shown in FIG. 23 and the noise is suppressed up to the low frequency band around the fs/8.

Accordingly, it may be said that the noise reduction can be performed up to the lower frequency band when compared to the 2-D adaptive type LPF in the art.

Based upon above discussion, the noise reduction apparatus of this configuration can reduce the noise in a low frequency band which is more conspicuous from visual characteristics perspective, and can further suppress the detail deterioration with a low amplitude when compared to the conventional manner.

In addition, since the simultaneous processing means to be required for noise extraction also serves as the simultaneous processing means required for the filter operation means, a circuit scale can be suppressed smaller when compared to a case where it does not serve as the above.

Figure 4:
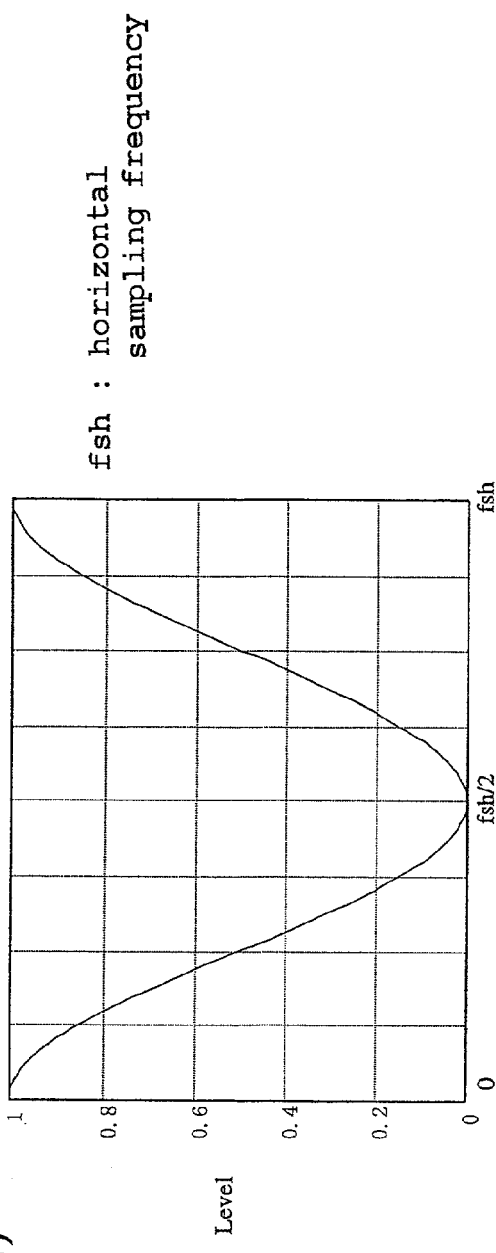
FIG. 4(a) and FIG. 4(b) are frequency characteristics charts showing one example of frequency characteristics of filter operation means used for the first preferred embodiment.
Figure 4:
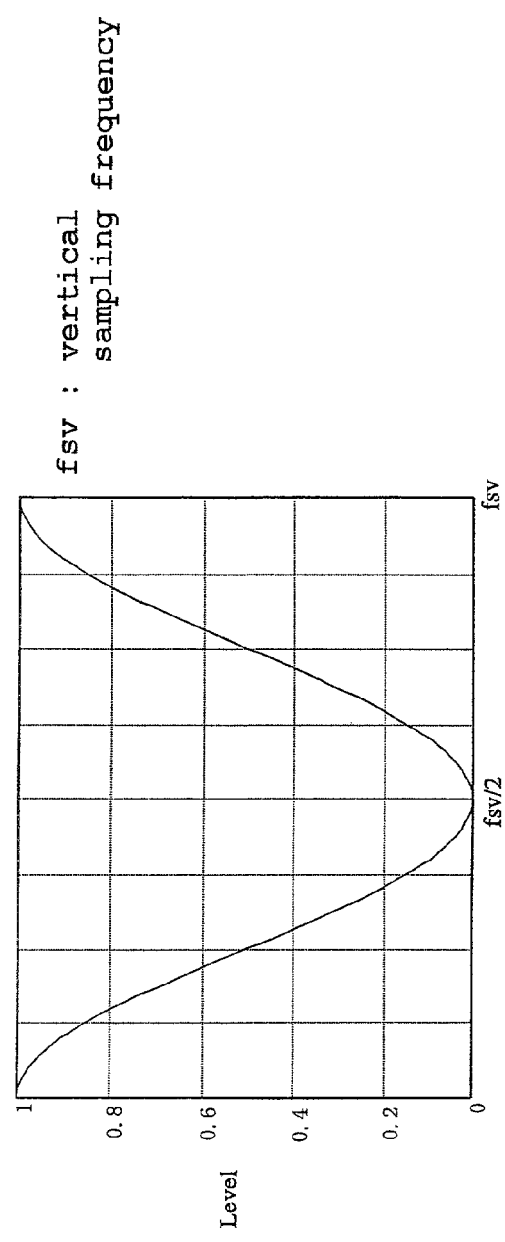

Incidentally, with respect to the first preferred embodiment described above, the frequency characteristics of the filter operation means 2a–2c are configured as in FIG. 4(*a*) and FIG. 4(*b*), but it is to be understood that the frequency characteristics are not intended to be limited to these specific characteristics.

Figure 8A:
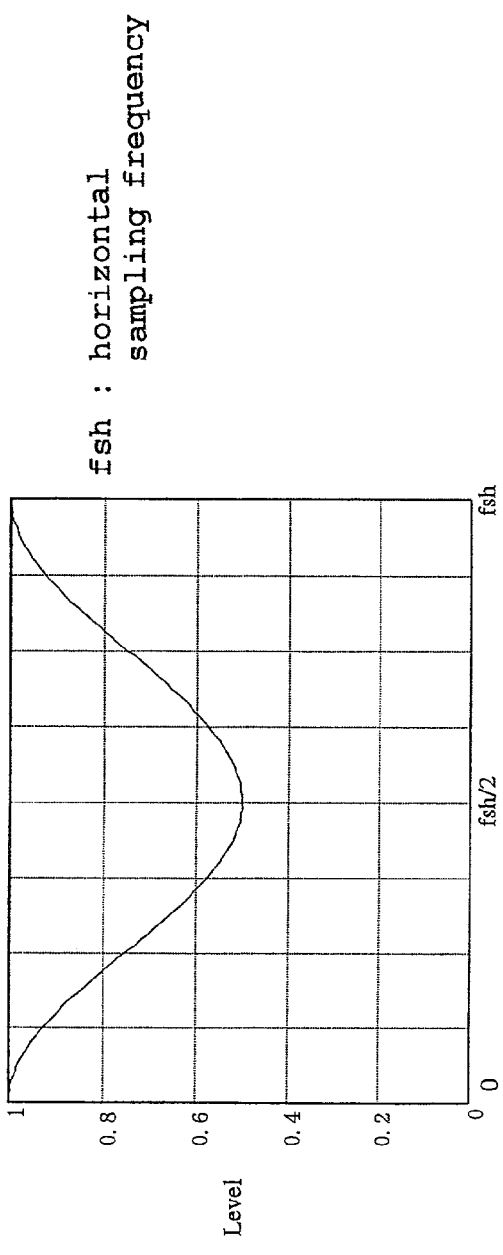
FIG. 8(a) and FIG. 8(b) are frequency characteristics charts showing examples of the frequency characteristics of the filter operation means used for the first preferred embodiment.
Figure 8B:
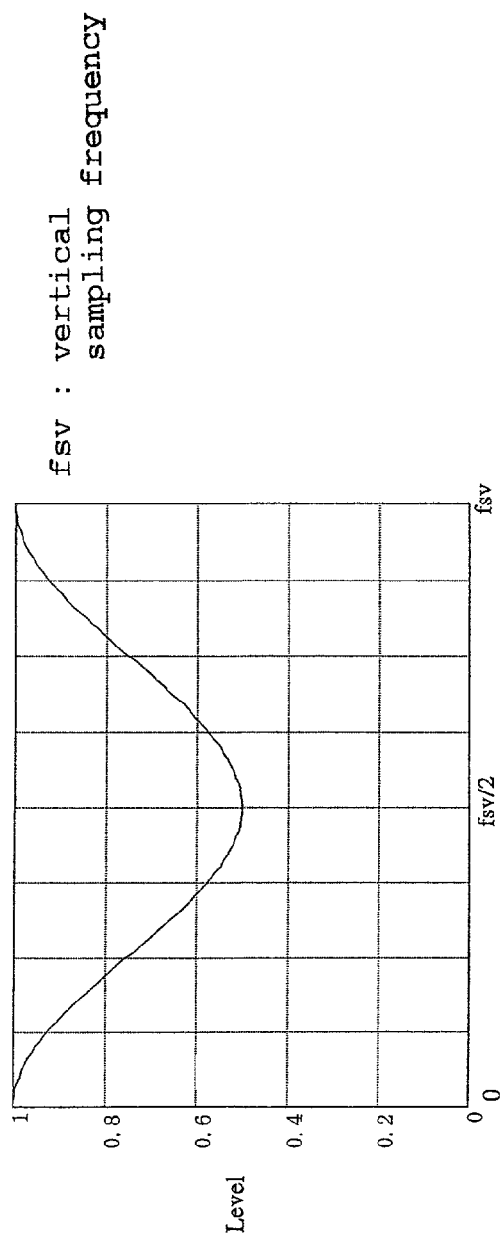

For example, if the constant value generator 36 in the filter operations means 2a–2c generates kv=kh=96, frequency characteristics can be obtained as shown in FIG. 8(*a*) and FIG. 8(*b*). In this case, since the output signals from the filter operation means 2a–2c to be inputted into the noise components extraction means 11 become signals with which remains signals in a high frequency band to some extent, consequently, not only the noise in a low frequency band but also the noise in a high frequency band are reduced to some extent.

Accordingly, when S/N of the input image signals S1 is not satisfied and the noise in a high frequency band has to be reduced, it will become an effective manner. As discussed above, it is possible to perform the effective noise reduction processing with respect to any input image signals by means of changing values of kv and kh generated by the constant value generator 36 in the filter operation means 2a–2c.

Second Preferred Embodiment

Figure 9:
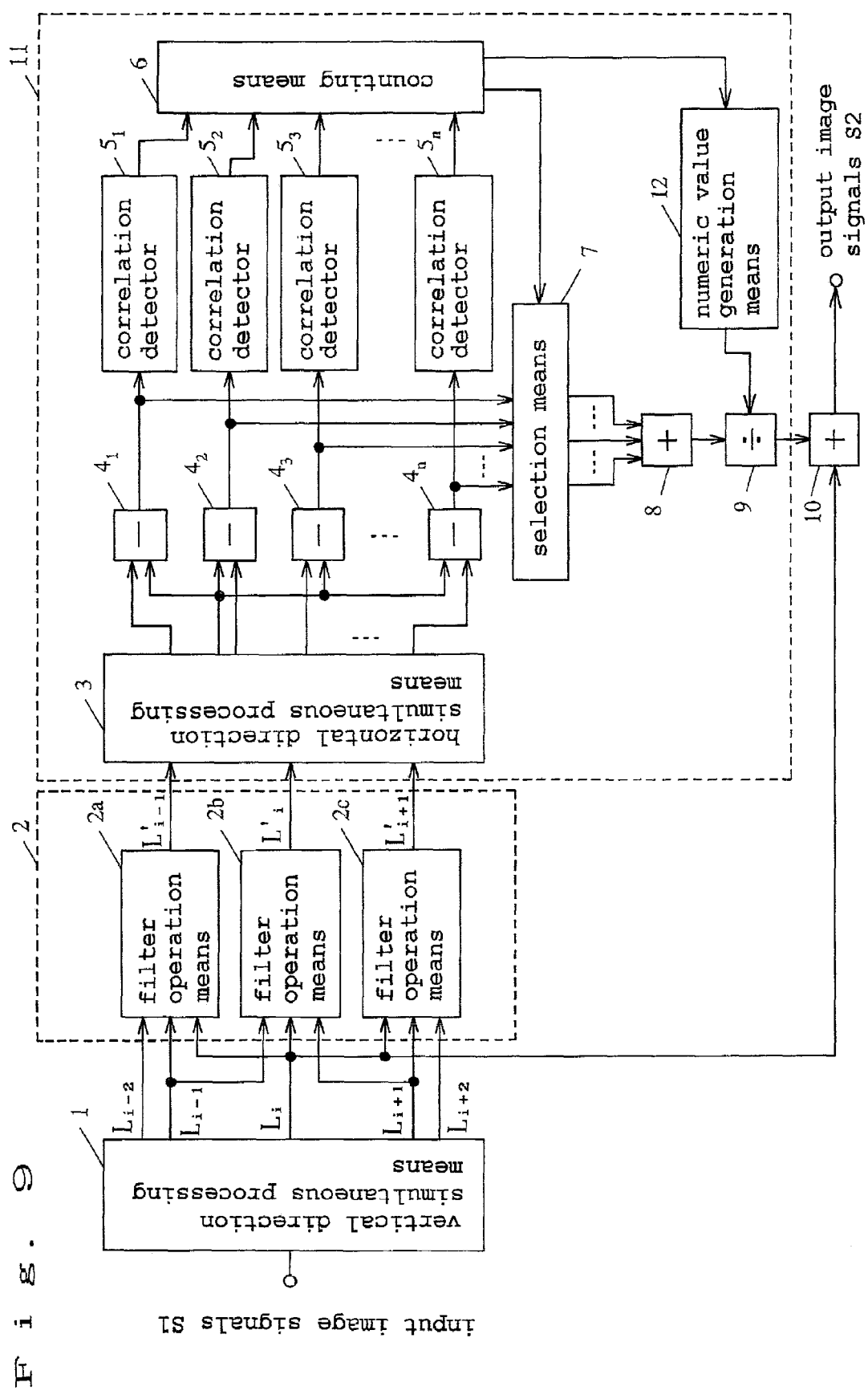
FIG. 9 is a block diagram showing a configuration of a noise reduction apparatus of a second preferred embodiment according to the present invention.

Then, the second preferred embodiment of the present invention will be explained. FIG. 9 shows a block diagram illustrating a basic feature configuration of a noise reduction apparatus of the second preferred embodiment according to the present invention.

In FIG. 9, as the same reference numerals and symbols are given to function blocks having the same function as in FIG. 1 of the first preferred embodiment described above, explanation regarding the blocks will be omitted. Reference numeral 12 designates numeric value generation means of generating a certain numeric value according to a divisor outputted from counting means 6, and outputs it to a divider 9.

The numeric value generation means 12 outputs a suitable value of a power of 2 according to a divisor outputted by the counting means 6.

One example of input/output characteristics of the numeric value generation means 12 is shown in FIG. 10. That is, the input/output characteristics show that a maximum power of 2 not exceeding a value meant by input signals is outputted when the value meant by the input signals is not a power of 2, or that a minimum power of 2 exceeding a value meant by input signals is outputted when the value meant by the input signals is equal to the number of pixels of signal block forming means.

The divider 9 calculates an average value of differences between a processing object pixel for noise extraction and peripheral pixels by means of dividing the total sum of the outputs of an adder 8 by an output from the numeric value generation means 12 and outputs it to an adder 10.

According to a configuration like this, it is possible to reduce a circuit scale smaller when compared to the first preferred embodiment since the divider 9 becomes very simple circuit just performing a bit shift operation. In addition, deterioration of the noise reduction performance becomes smaller due to circuit simplification, too. This will be explained hereafter.

$$d + \{(b'_2 - b'_1) + \ldots + (b'_n - b'_1)\}/k \quad \text{(Arithmetic expression 7)}$$

In the second preferred embodiment, an operation on the "arithmetic expression 7" is performed as an operating function. Where, supposing that $b'_1$ is a value of a processing object pixel for noise extraction, $b'_2$–$b'_n$ are values of peripheral pixels correlating with it, d is a value of an output pixel from vertical direction simultaneous processing means 1 to be in the same spatial location as the processing object pixel for noise extraction and k is a numeric value generated by the numeric value generation means 12.

$$d + \{(b'_2 - b'_1) + \ldots + (b'_n - b'_1)\}/k = \quad \text{(Arithmetic expression 8)}$$
$$d + n/k \times \{(b'_2 - b'_1) + \ldots + (b'_n - b'_1)\}/n$$

The "arithmetic expression 8" is obtained by transforming the "arithmetic expression 7".

Though an average of differences becomes a value to be multiplied by a gain n/k when compared to the first preferred embodiment, the average value of the difference results in still a low value when compared to the data d because the difference is obtained by selecting only the peripheral pixels having correlations hereby. Accordingly, the deterioration of the noise reduction performance by circuit simplification is suppressed to a minimum.

However, in the second preferred embodiment described above, the input/output characteristics of the numeric value generation means 12 are not intended to be limited to the characteristics shown in FIG. 10, but can be freely determined within the range where the deterioration of the noise reduction performance by circuit simplification is suppressed to a minimum.

Third Preferred Embodiment

Figure 11:
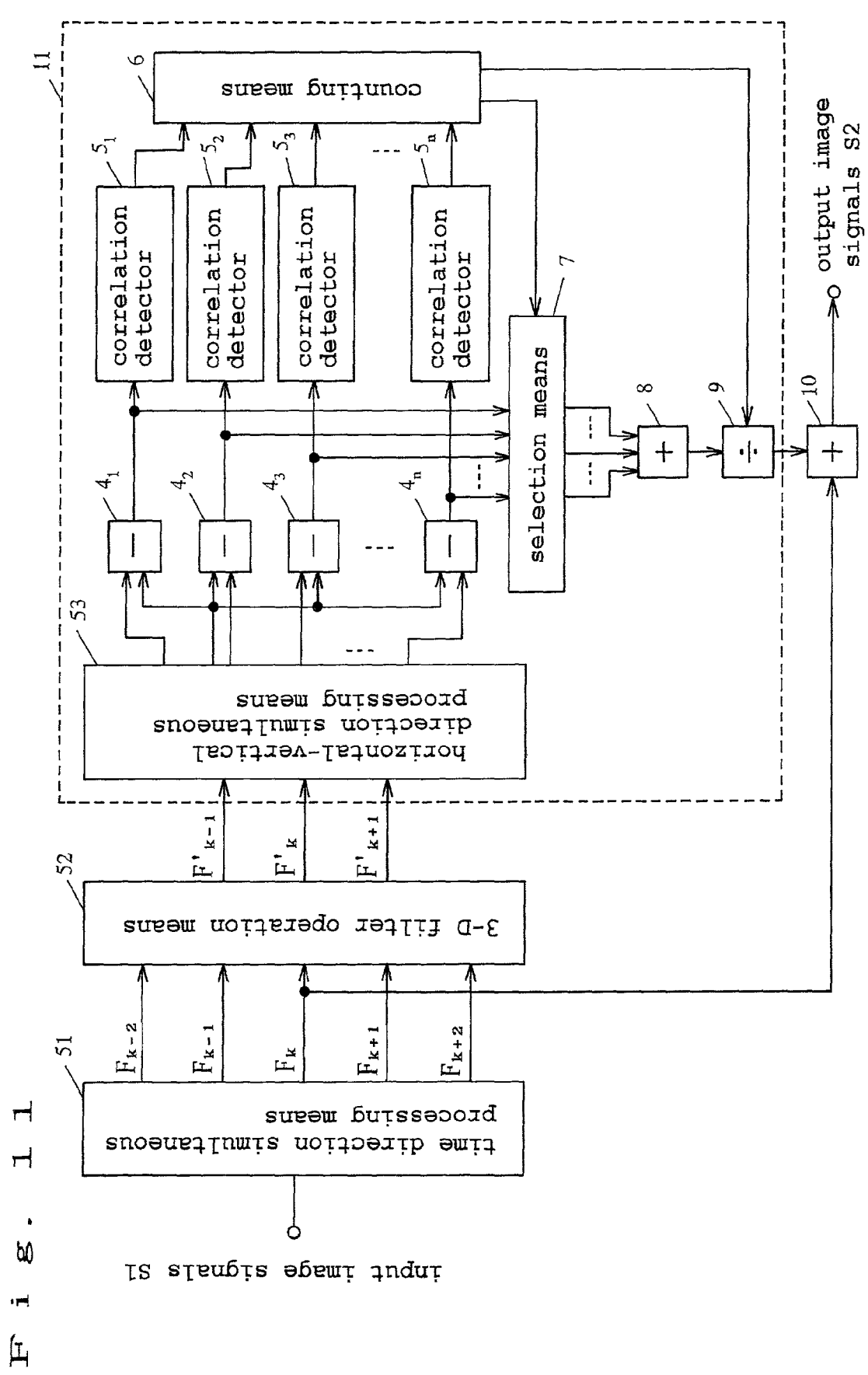
FIG. 11 is a block diagram showing a configuration of a noise reduction apparatus of a third preferred embodiment according to the present invention.

Next, the third preferred embodiment of the present invention will be explained. FIG. 11 shows a block diagram illustrating a basic feature configuration of a noise reduction apparatus of the third preferred embodiment according to the present invention.

In FIG. 11, as the same reference numerals and symbols are given to function blocks having the same function as in FIG. 1 of the first preferred embodiment described above, explanation regarding the blocks will be omitted. Reference numeral 51 designates time direction simultaneous processing means as simultaneous processing means of simultaneously outputting a plurality of fields (i.e., processing them simultaneously in terms of time) with respect to input image signals S1. Reference numeral 52 designates 3-D filter operation means as filter operation means which performs filter operations in the time and space directions with respect to the outputs from the time direction simultaneous processing means 51, and outputs them to noise components extraction means 11. Reference numeral 53 designates horizontal-vertical direction simultaneous processing means as block forming means which performs simultaneous processing with respect to the outputs from the 3-D filter operation means 52 in the horizontal and the vertical directions, and forms a signal block to be outputted.

Incidentally, the time direction simultaneous processing means 51 is capable of simultaneously processing the image signals contained in fields (or frames) having different times in terms of time.

Points of the third preferred embodiment different from the first preferred embodiment are the time direction simultaneous processing means 51, the 3-D filter operation means 52 and the horizontal-vertical direction simultaneous processing means 53, therefore those operations will be explained hereafter. In addition, the preferred embodiment of a noise reduction method according to the present invention will be referred to together.

A major feature of the preferred embodiment consists of a configuration to suppress noise components having fast change in terms of time and to leave the noise components having slow change in terms of time in the 3-D filter operation means 52. Additionally, another feature of the preferred embodiment is that it is capable of effectively reducing visually conspicuous noise components having slow change in terms of time because a threshold value in the noise extraction means 11 of the next stage can be set higher than the conventional manner.

First, the time direction simultaneous processing means 51 performs the simultaneous processing of signals contained in sequential five fields with respect to image signals S1 inputted from an input terminal and outputs them.

Figure 12:
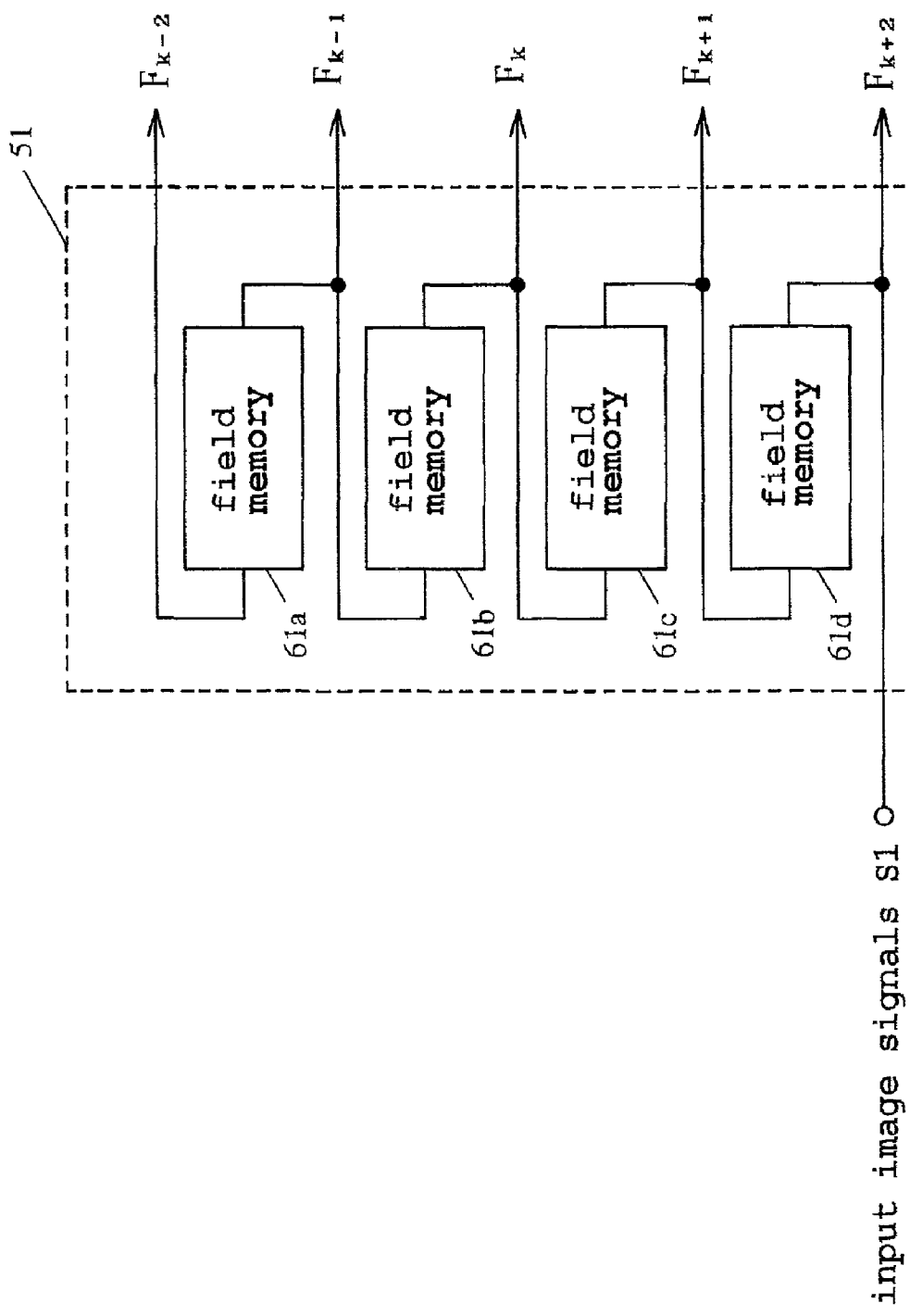
FIG. 12 is a block diagram showing a configuration example of time direction simultaneous processing means used for the third preferred embodiment.

FIG. 12 is a block diagram showing one example of such time direction simultaneous processing means 51, where, reference numerals 61a–61d designate field memories, each of which delays signals by one field period. In this case, five fields $F_{k-2}$–$F_{k+2}$ are simultaneously processed with respect to the input signals and are outputted.

After performing the LPF processing in the time direction with respect to $F_{k-1}$, $F_k$, $F_{k+1}$ using the outputs $F_{k-2}$–$F_{k+2}$ from the time direction simultaneous processing means 51 at first, the 3-D filter operation means 52 further performs the 2-D LPF processing in the horizontal and the vertical directions, consequently, and then outputs $F'_{k-1}$, $F'_k$, $F'_{k+1}$ to the next stage.

Figure 13B:
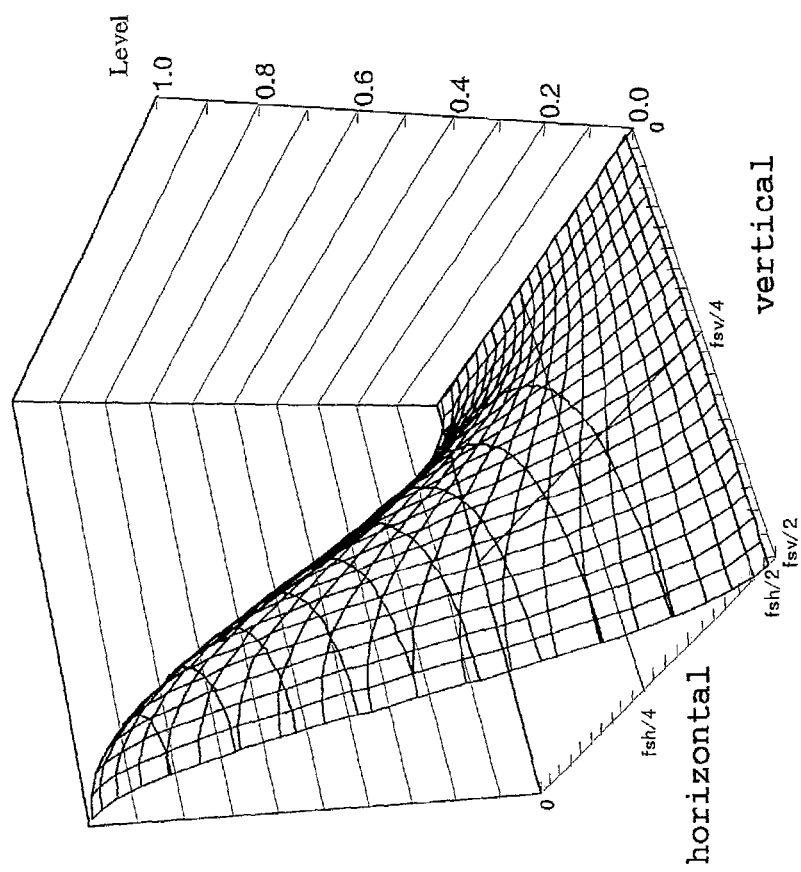
FIG. 13(a) and FIG. 13(b) are frequency characteristics charts showing examples of frequency characteristics of 3-D filter operation means used for the third preferred embodiment.
Figure 13A:
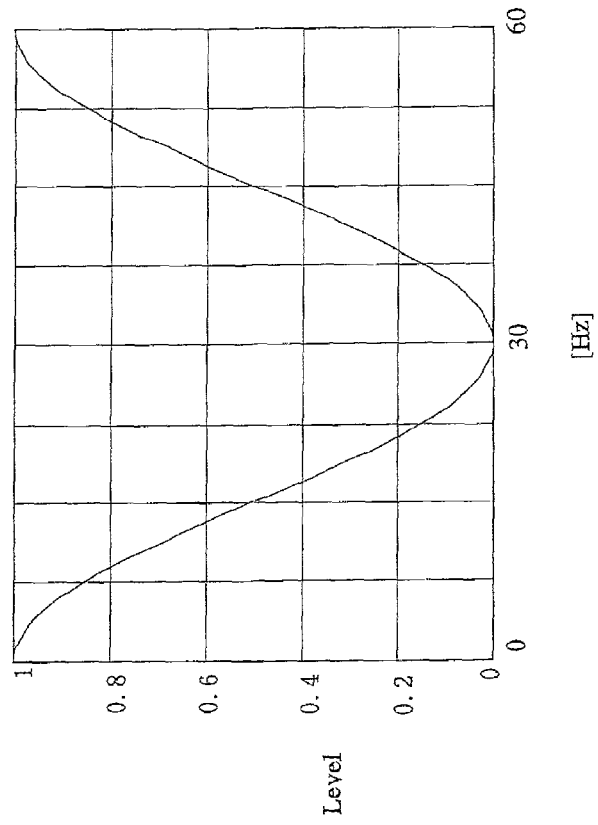

One example of frequency characteristics of the 3-D filter operation means 52 is shown in FIG. 13(a) and FIG. 13(b) FIG. 13(a) shows LPF characteristics in the time direction and FIG. 13(b) shows 2-D LPF characteristics in horizontal-vertical directions. In this case, the outputs $F'_{k-1}$, $F'_k$, $F'_{k+1}$ from the 3-D filter operation means 52 are outputted to the next stage wherein signals in a low frequency band lower than or equal to 15 Hz, fsh/4 and fsv/4 are extracted in terms of time and space.

The horizontal-vertical direction simultaneous processing means 53 configures 2-D signal block consisting of a plurality of pixels based upon each outputs $F'_{k-1}$, $F'_k$, $F'_{k+1}$ from the filter operation means 52, i.e., 3-D signal block.

Figure 14:
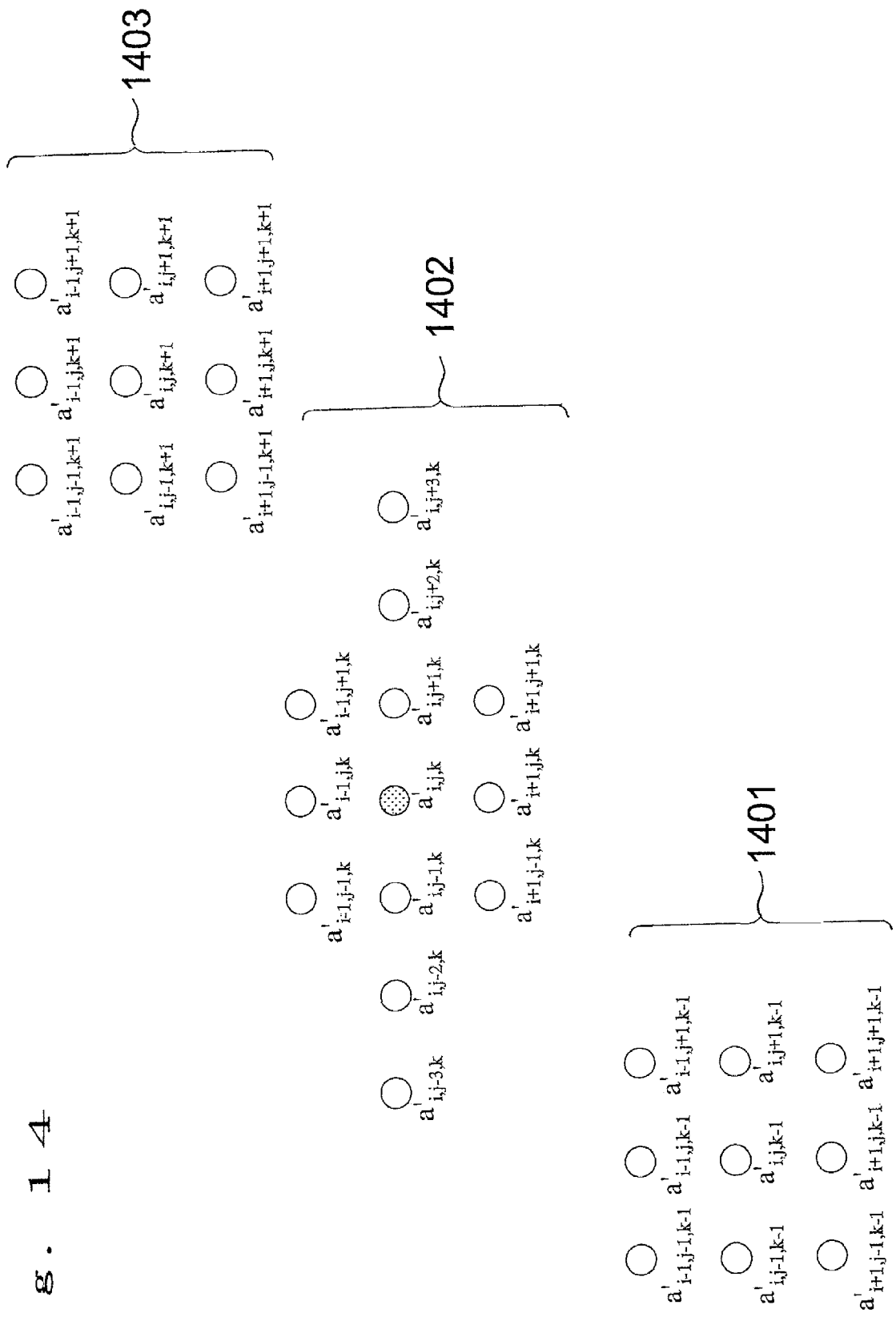
FIG. 14 is a schematic diagram showing one example of a signal block formed by horizontal-vertical direction simultaneous processing means used for the third preferred embodiment.

FIG. 14 shows a case where a signal block consisting of total 31 pixels, i.e., 9 pixels based upon $F'_{k-1}$ (reference numeral 1401 is given to), 13 pixels based upon $F'_k$ (reference numeral 1402 is given to) and 9 pixels based upon $F'_{k+1}$ (reference numeral 1403 is given to) are formed, and $a'_{i,j,k}$ is called a processing object pixel for noise extraction and pixels excluding $a'_{i,j,k}$ are called as peripheral pixels.

Figure 26:
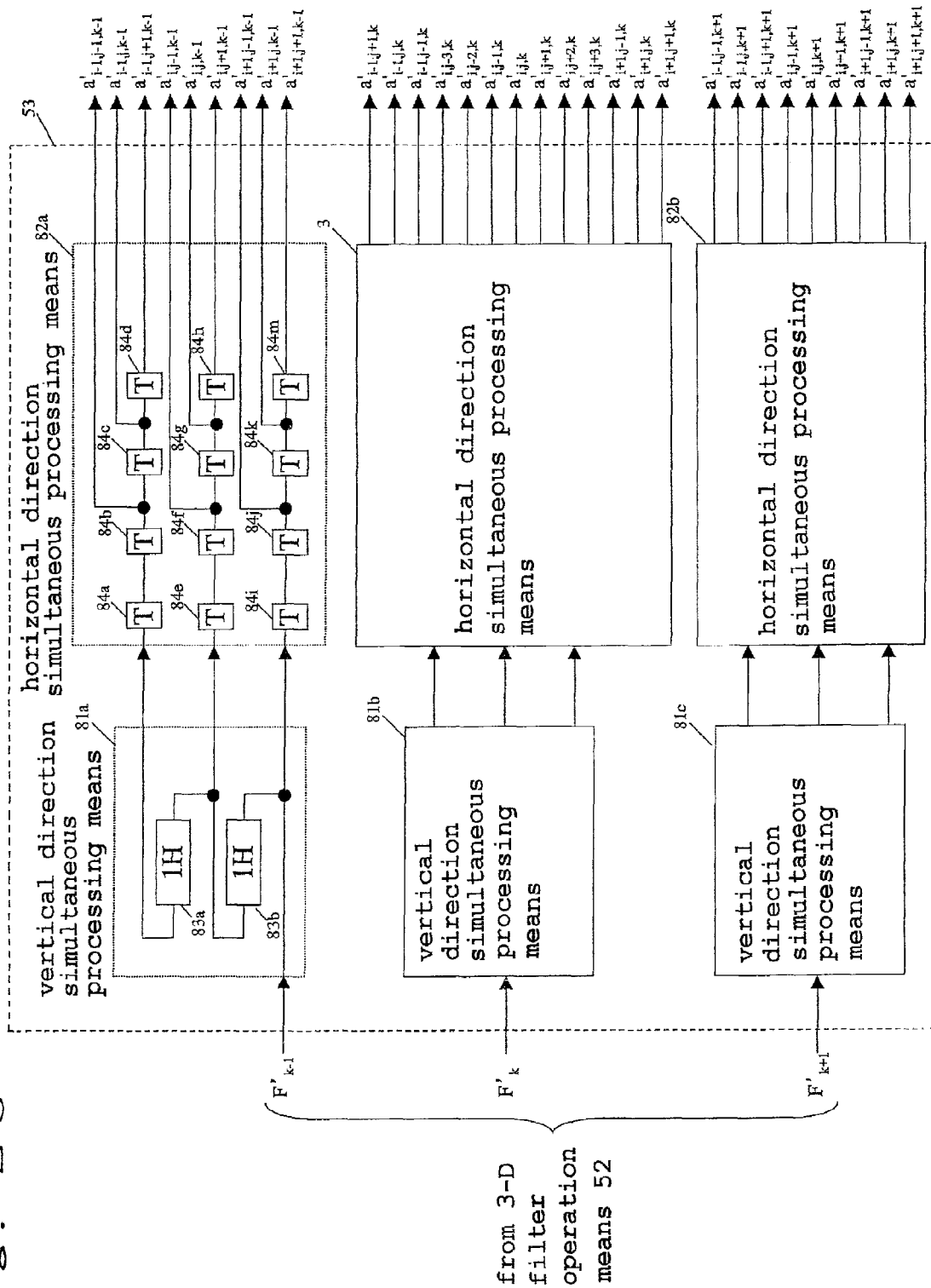
FIG. 26 is a block diagram showing a configuration example of horizontal-vertical direction simultaneous processing means 53 used for the third preferred embodiment of the present invention.

One example of horizontal-vertical simultaneous processing means 53 required for forming the signal block in FIG. 14 is shown in FIG. 26 herein. In FIG. 26, reference numerals 81a–81c represent vertical direction simultaneous processing means, each of which has the same configuration and consists of 1H delay elements having reference numerals 83a and 83b. In addition, reference numerals 82a and 82b represent horizontal direction simultaneous processing means, each of which has the same configuration and consists of 1T delay elements having reference numerals 84a–84m. Reference numeral 3 represents horizontal direction simultaneous processing means having the same configuration as the horizontal direction simultaneous processing means 3 described in the first preferred embodiment.

Explanation will be returned to FIG. 14 again. Steps of calculating an average of differences between the processing object pixel $a'_{i,j}$ for noise extraction and the peripheral pixels using pixels having reference numerals 1401–1403 and outputting the result to an adder 10 are the same as the first preferred embodiment, therefore explanation will be omitted.

The adder 10 adds a value of the pixel $y_{i,j,k}$ having the same time and space location as the processing object pixel $a'_{i,j,k}$ for noise extraction out of the output $F_k$ of the time direction simultaneous processing means 51 to an average of differences between the processing object pixel $a'_{i,j,k}$ for noise extraction as the output of the divider 9 and the peripheral pixels, and outputs the result as output image signals S2.

According to above operations, noise in a low frequency band is mainly extracted in terms of time and space and the noise reduction is performed based upon it. The noise in a low frequency band in terms of time is visually conspicuous since it changes slowly in terms of time, however, according to the present configuration, even such noise can be reduced effectively.

Additionally, because the simultaneous processing means to be required for noise extraction also serves as the time direction simultaneous processing means 51 required for the filter operation means, a circuit scale can be suppressed smaller when compared to a case where it does not serve as the above.

Incidentally, the frequency characteristics of the 3-D filter operation means 52 are shown in FIG. 13(a) and FIG. 13(b) in the third preferred embodiment described above, however, it will be appreciated that it is not limited to those, and the noise reduction processing can be performed to any input image signals by varying characteristics depending upon the noise levels of the input image signals.

Further, the third preferred embodiment described above has a configuration that a divisor of averaging processing outputted by counting means 6 is directly inputted into the divider 9, but it may be configured to insert in-between numeric value generation means of outputting a value of an appropriate power of 2 according to the divisor outputted from the counting means 6 as is the case with the second preferred embodiment. Thus, it is possible to reduce a circuit scale smaller when compared to the third preferred embodiment.

Furthermore, in the third preferred embodiment described above, though a case is referred where the configuration of the signal block formed by the time direction simultaneous processing means 51 and the horizontal-vertical direction simultaneous processing means 53, and the processing object pixel for noise extraction is as shown in FIG. 14, it is possible to perform other configurations similarly.

Fourth Preferred Embodiment

Figure 15:
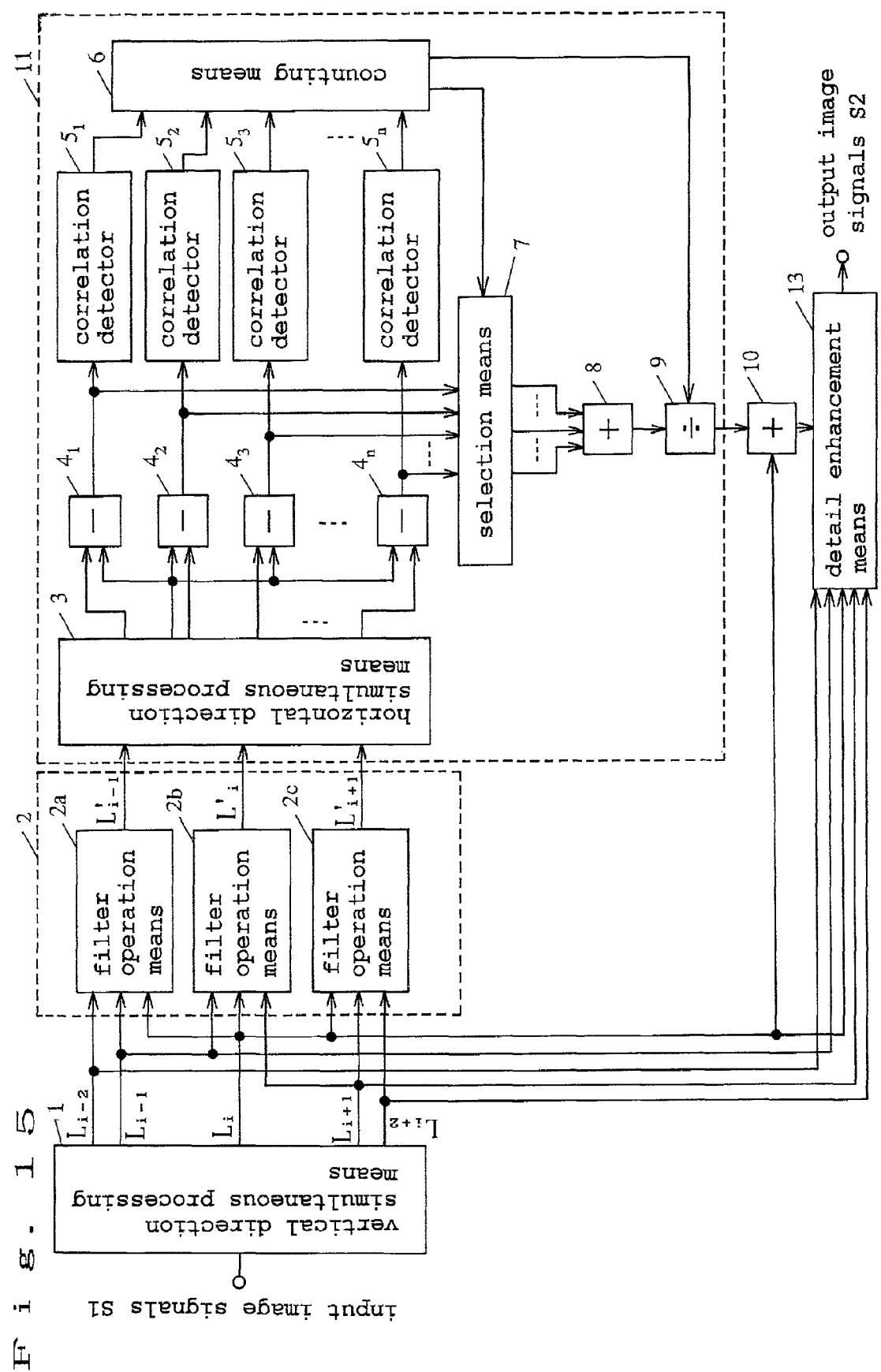
FIG. 15 is a block diagram showing a configuration of a noise reduction apparatus of a fourth preferred embodiment according to the present invention.

Next, the fourth preferred embodiment of the present invention will be explained. FIG. 15 shows a block diagram illustrating a basic feature configuration of a noise reduction apparatus of the fourth preferred embodiment according to the present invention.

In FIG. 15, as the same reference numerals and symbols are given to function blocks with the same function as in FIG. 1 of the first preferred embodiment described above, explanation regarding the blocks will be omitted. Reference numeral 13 designates detail enhancement means of performing detail enhancement processing with respect to outputs from an adder 10 using vertical direction simultaneous processing means 1.

Figure 16:
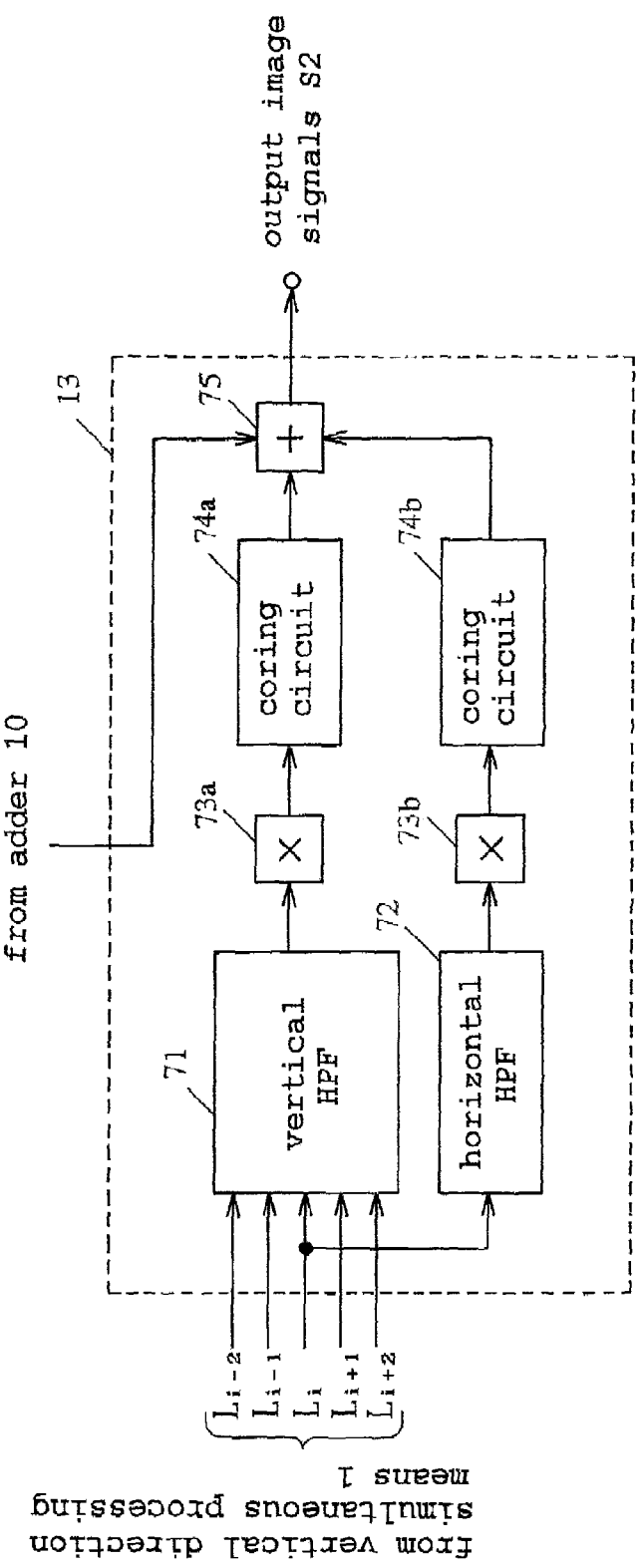
FIG. 16 is a block diagram showing a configuration example of detail enhancement means used for the fourth preferred embodiment.

FIG. 16 is a block diagram showing one example of the detail enhancement means 13. Where, reference numeral 71 represents a vertical high-pass filter (HPF) for performing HPF operations in the vertical line direction with respect to outputs $L_{i-2}$–$L_{i+2}$ from vertical direction simultaneous processing means 1. Reference numeral 72 represents a horizontal high-pass filter (HPF) for performing HPF operations in the horizontal direction with respect to an output Li from the vertical direction simultaneous processing means 1. Reference numerals 73a and 73b represent multipliers to multiply outputs from the vertical HPF 71 and the horizontal HPF 72 by a constant (gain). Reference numerals 74a and 74b represent coring circuits for performing coring processing with respect to outputs from the multipliers 73a and 73b. Reference numeral 75 represents an adder for adding outputs from the coring circuits 74a and 74b to an output of an adder 10.

A point of the fourth preferred embodiment different from the first preferred embodiment is the detail enhancement means 13, therefore the operation will be explained hereafter. In addition, the preferred embodiment of a noise reduction method according to the present invention will be explained together.

First, the vertical HPF 71 performs HPF operations with respect to five lines of the outputs $L_{i-2}$–$L_{i+2}$ from the vertical direction simultaneous processing means 1 in the vertical line direction, and extracts high frequency components in the vertical line direction.

Figure 17:
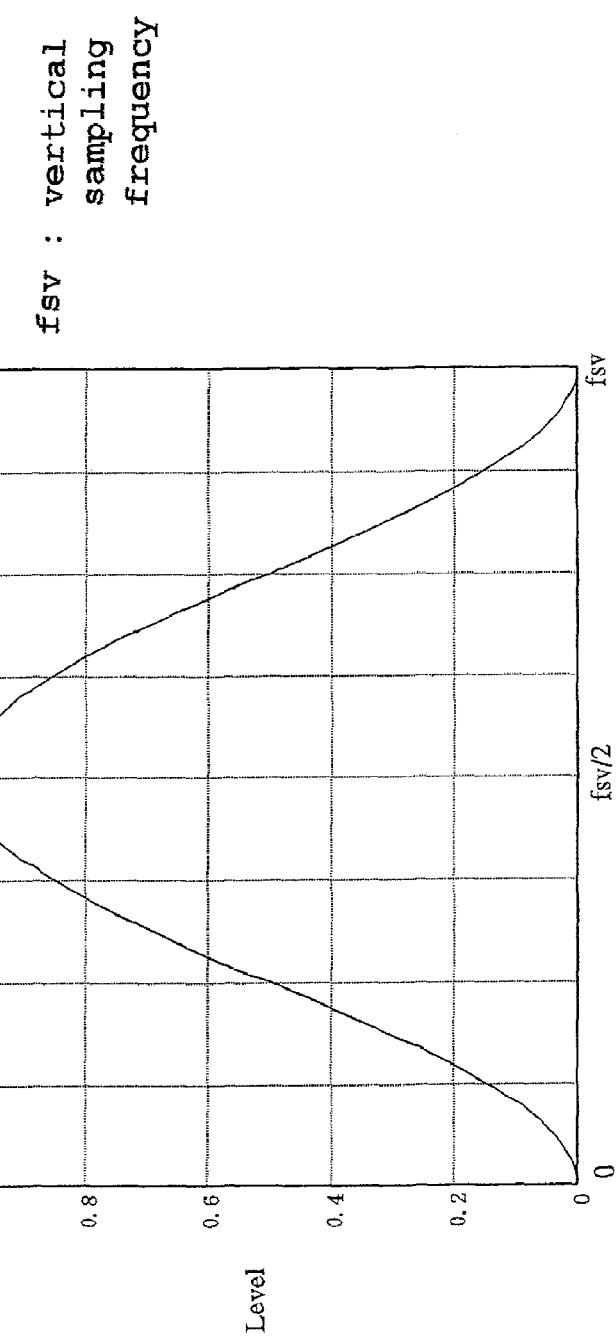
FIG. 17 is a frequency characteristics chart showing one example of HPF frequency characteristics in the detail enhancement means used for the fourth preferred embodiment.

FIG. 17 is a chart of frequency characteristics showing one example of frequency characteristics of the vertical HPF. The output from the vertical HPF 71 is outputted to the next coring circuit 74a after multiplied by an appropriate gain in the multiplier 73a.

The coring circuit 74a performs the processing as shown by an "arithmetic expression 9", supposing the input signal is x and the output signal is w.

$w=0$ (where $-m; \leq x \leq m$)

$w=x-m$ (where $x>m$)

$w=x+m$ (where $x<-m$)  (Arithmetic expression 9)

Where, m is a positive constant.

Figure 18:
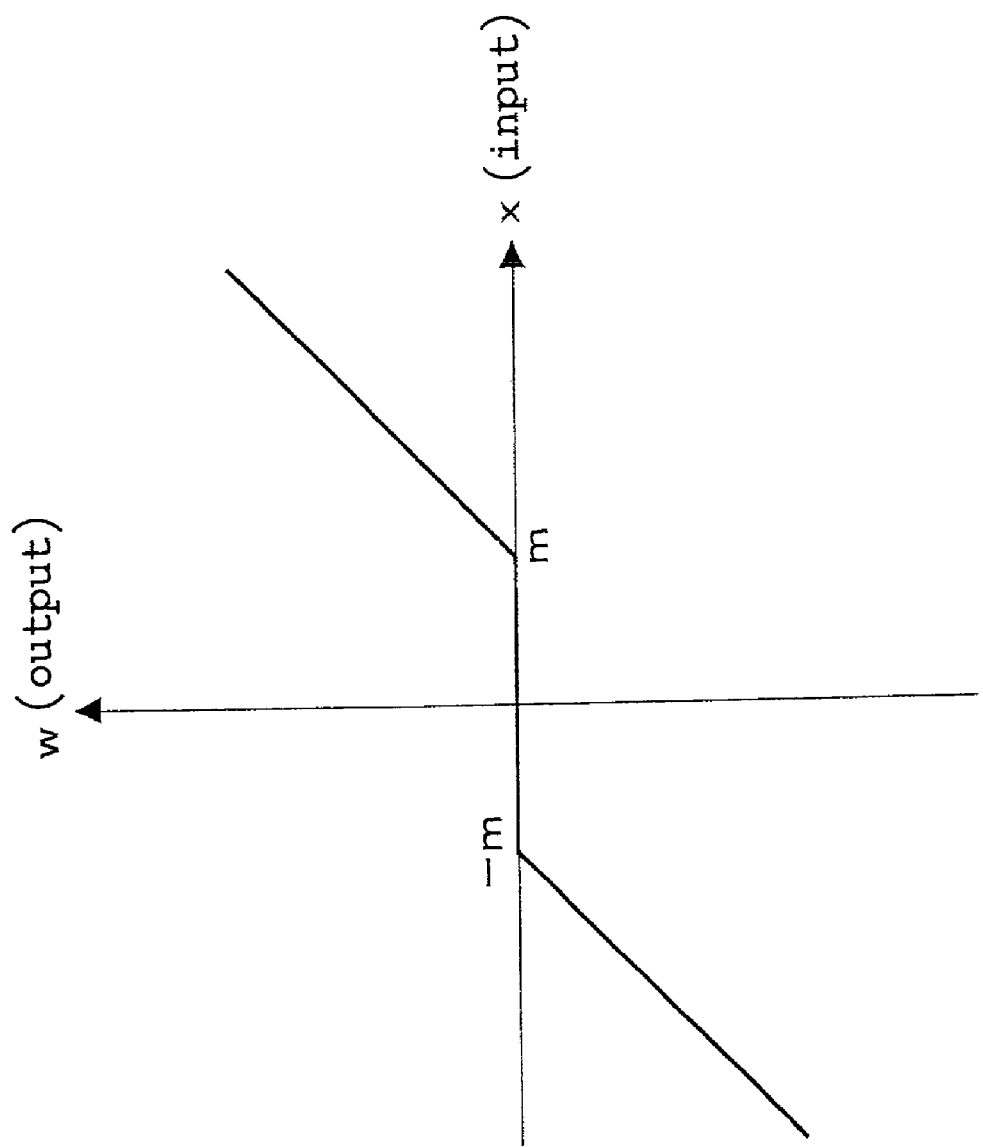
FIG. 18 is a characteristics chart showing input-output characteristics of a coring circuit in the detail enhancement means used for the fourth preferred embodiment.
Figure 19:
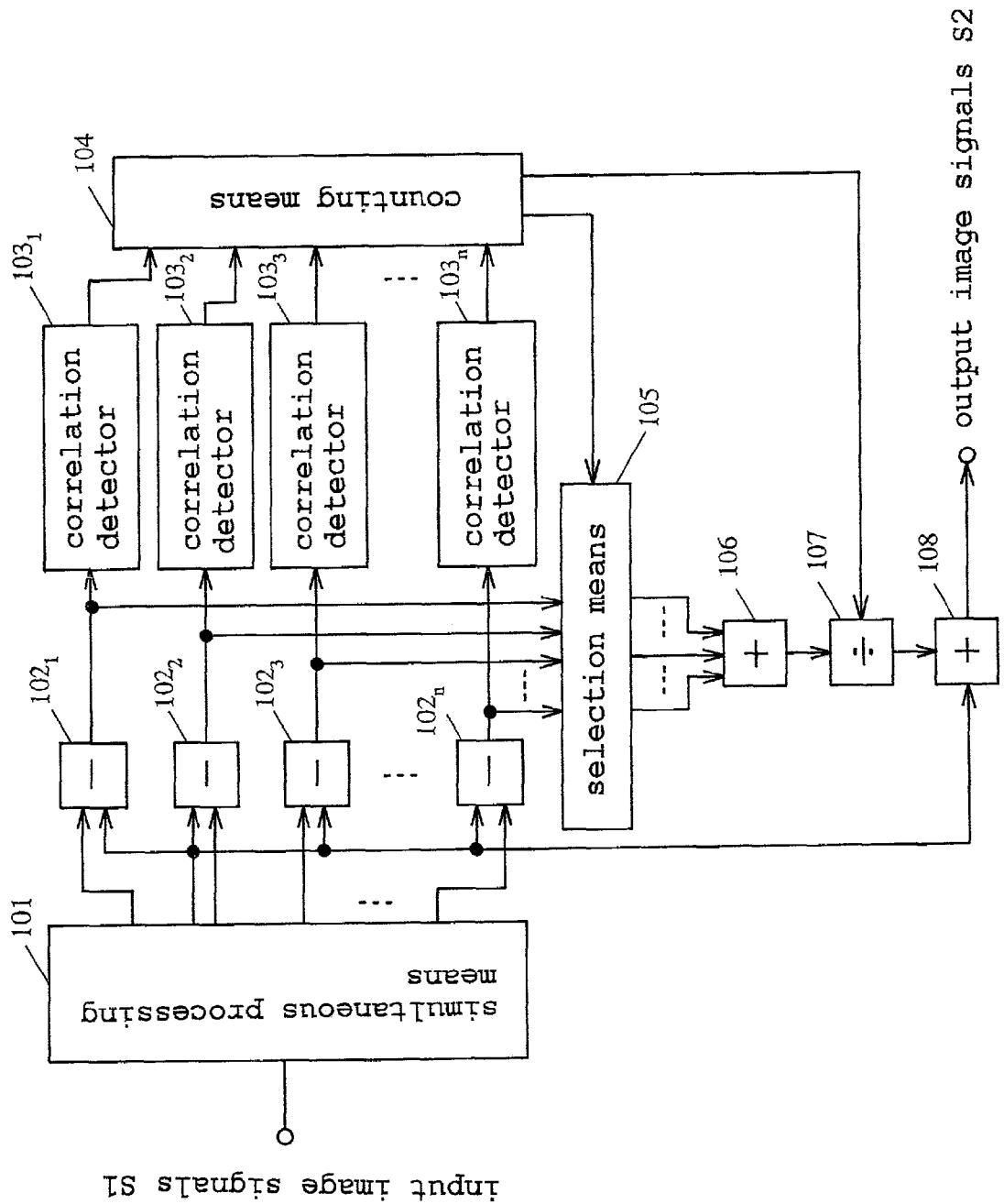
FIG. 19 is a block diagram showing a configuration of a noise reduction circuit in the art.

In other words, as shown in FIG. 18, the output signal becomes zero when the input signal is lower than the constant level m in amplitude, and the coring circuit performs such processing as to subtract the absolute level value m when the input signal is greater than the constant level m in amplitude.

Accordingly, it is meant that when the noise having a very low amplitude is contained in the output, which is a vertical high frequency components, the noise is removed by means of this processing from the multiplier 73a.

The above description is explained using an example of a processing path in the vertical direction, signal processing in the horizontal direction from the horizontal HPF 72 to the coring circuit 74b is performed in the same manner.

Those processing results, i.e., the outputs of the coring circuit 74a and 74b are added to the output of the adder 10 at the adder 75 and the added value is outputted as output signals S2. The output from the adder 10 is the output which has been performed the noise reduction processing with respect to the input image signals S1 and noise-reduced signals with enhanced detail are to be provided by adding the horizontal-vertical high frequency components, from which the noise is removed.

According to the configuration described above, the detail deterioration can be improved further when compared to the first preferred embodiment because the processing for restoring details deteriorated to some extent by the noise reduction processing is performed. Further, a circuit scale required for improvements of detail deterioration is minimized because the simultaneous processing means required for detail enhancement also serves as the simultaneous processing means in the noise reduction apparatus.

Incidentally, the characteristics of the vertical HPF and the horizontal HPF of the fourth preferred embodiment described above are not intended to be limited to the characteristics shown in FIG. 17, it is essential only that the characteristics have high-pass type characteristics.

Further, the fourth preferred embodiment described above has a configuration where a divisor of averaging processing outputted by the counting means 6 is directly inputted to the divider 9, but, it may be configured to insert in-between numeric value generation means of outputting a value of an appropriate power of 2 according to the divisor outputted by the counting means 6 just as the case with the second preferred embodiment. Thus, it is possible to reduce a circuit scale smaller when compared to the fourth preferred embodiment.

Furthermore, it is appreciated that the detail enhancement means in the fourth preferred embodiment described above is not intended to be limited to the configuration shown in FIG. 16.

In addition, in the first, the second and the fourth preferred embodiments described above, though it is referred to a case where the configuration of the signal block formed by the vertical direction simultaneous processing means 1 and the horizontal direction simultaneous processing means 3, and the processing object pixel for noise extraction are shown in FIG. 5, it is possible to perform other configurations similarly. Accordingly, internal configurations of the vertical direction simultaneous processing means 1 and the horizontal direction simultaneous processing means 3 are not intended to be limited to the circuits shown in FIG. 2 and FIG. 6.

In addition, in the first, the second and the fourth preferred embodiments described above, a plurality of the numbers of lines simultaneously performed by the simultaneous processing means are supposed to be 5, but it is not limited to this number of lines.

In addition, in the third preferred embodiment described above a plurality of the numbers of fields simultaneously performed by the simultaneous processing means are supposed to be 5, but it is not limited to this number of fields.

In addition, the detail enhancement means in the fourth preferred embodiment described above may be added to the configuration of the third preferred embodiment.

In addition, in the preferred embodiment described above, the field signals are mainly explained as the image signals, but it is not limited to these, for example, the same effect is provided with the frame signals using the same configuration.

Incidentally, a program according to the present invention is a program for a computer to execute functions of all or a part of means of the noise reduction apparatus of the present invention described above (or device, element, circuit, part, etc.), and for cooperatively working with the computer.

Further, a program according to the present invention is a program for a computer to execute all or a part of operations of all or a part of steps of the noise reduction method of the present invention described above (or process, operation, action, etc.), and for cooperatively working with the computer.

Furthermore, a medium according to the present invention is a medium having a program for a computer to execute all or a part of functions of all or a part of means of the noise reduction apparatus of the present invention described above, wherein the computer is able to read out and the program read out executes the functions cooperatively working with the computer.

In addition, a medium according to the present invention is a medium having a program for a computer to execute all or a part of operations of all or a part of steps of the noise reduction method of the present invention described above, wherein the computer is able to read out and the program read out executes the functions cooperatively working with the computer.

Incidentally, "a part of means" (or device, element, circuit, portion, etc.) of the present invention described above and "a part of steps" (or process, operation, action, etc.) of the present invention described above mean several means or several steps within a plurality of those means or steps, or mean a part of functions or a part of operations within one means or one step.

Further, one of the usage configurations of the program according to the present invention may be a configuration wherein the program is memorized in readable memory media by a computer and operates cooperatively working with the computer.

Furthermore, one of the configurations of a program according to the present invention may be a configuration wherein the program transmits through transmission media, is read out by the computer and operates cooperatively working with the computer.

In Addition, a database, a data format, a data table, a data list and a data type are included as a data structure of the present invention.

In Addition, ROMs or the like are included as recording media, and transmission media such as the Internet, etc., light, a radio wave and an acoustic wave or the like are included as transmission media.

In addition, the computer of the present invention described above may include not only pure hardware such as a CPU, etc., but also firmware, OS, and further peripheral devices.

Incidentally, as described above, the configuration of the present invention may be achieved from the software point of view or the hardware point of view.

As it is clear according to the above discussion, the present invention has a feature capable of effectively reducing the visually conspicuous noise in a low frequency band, and suppressing the detail deterioration with a low amplitude to minimum.

Further, the present invention has a feature capable of reducing a circuit scale because the simultaneous processing means to be required for noise extraction above serves as the simultaneous processing means required for filter operation means.

What is claimed is:

1. A noise reduction apparatus, comprising:
   simultaneous processing means of allowing to simultaneously processing image signals of a portion containing a noise processing object pixel to be inputted, wherein (a) the image signals are existing in spatially different locations, or (b) the image signals are contained in fields or frames at different times in terms of time;
   filter operation means of performing filter operations with respect to outputs of the simultaneous processing means;
   noise components extraction means of extracting noise components based upon outputs of the filter operation means; and
   noise attenuation means of attenuating noise using outputs of the noise components extraction means with respect to the noise processing object pixel within the outputs of the simultaneous processing means.

2. The noise reduction apparatus according to claim 1, wherein the filter operation means performs low pass filter type operations.

3. The noise reduction apparatus according to claim 1 or claim 2, further comprising detail enhancement means of generating detail enhancement signals based upon the outputs of the simultaneous processing means and adding the signals to the outputs of the noise attenuation means.

4. The noise reduction apparatus according to claim 1,
   wherein the simultaneous processing means comprises means of allowing to simultaneously processing the image signals existing in spatially different locations, and contained in a plurality of lines configuring images in fields or frames at a same time, and wherein the noise components extraction means comprises:
- (a) signal block forming means of forming a signal block consisting of a plurality of pixels based upon the output of the filter operation means;
- (b) a plurality of subtracting means of calculating differences between an object pixel located at the same spatial location as the noise processing object pixel within a plurality of pixels forming the signal block and a plurality of peripheral pixels located around the periphery of the object pixel respectively;
- (c) a plurality of comparators of comparing outputs of a plurality of the subtracting means with a predetermined level and outputting the comparison result signals;
- (d) counting means of counting the number of comparison result signals showing a lower level than the predetermined level out of outputs of a plurality of the comparators, and outputting signals showing the counting results and signals specifying a subtractor outputting the lower value than the predetermined value out of a plurality of the subtractors respectively;
- (e) selection means of selecting and outputting only outputs specified by the output of the counting means out of the outputs of a plurality of the subtracting means;
- (f) adding means of adding a plurality of outputs of the selection means; and
- (g) Dividing means of dividing an output of the adding means by the output of the counting means.

5. The noise reduction apparatus according to claim 1,
wherein the simultaneous processing means comprises means of allowing to simultaneously processing image signals contained in fields or frames at different times in terms of time, and
wherein the noise components extraction means, comprising:
- (a) signal block forming means of forming a signal block consisting of a plurality of pixels based upon the output of the filter operation means;
- (b) a plurality of subtracting means of calculating differences between an object pixel located at the same location as the noise processing object pixel in terms of time and space within a plurality of pixels forming the signal block and a plurality of peripheral pixels located around the periphery of the object pixel in terms of time and space respectively;
- (c) a plurality of comparators of comparing outputs of a plurality of the subtracting means with a predetermined level and outputting comparison result signals;
- (d) counting means of counting the number of comparison result signals showing a lower level than the predetermined level out of the outputs of a plurality of comparators, and outputting signals showing the results and signals specifying a subtractor outputting the lower value than the predetermined value out of a plurality of the subtractors respectively;
- (e) selection means of selecting and outputting only outputs specified by the output of the counting means out of a plurality of the subtracting means;
- (f) adding means of adding a plurality of outputs of the selection means; and
- (g) Dividing means of dividing an output of the adding means by the output of the counting means.

6. The noise reduction apparatus according to claim 4 or claim 5,
wherein the noise components extraction means further comprises numeric value generation means of generating a value according to the counting result from the counting means, and
wherein the dividing means divides the output of the adding means by the output of the numeric value generation means instead of the output of the counting means.

7. The noise reduction apparatus according to claim 6, wherein Input/output characteristics of the numeric value generation means outputs (a) a maximum power of 2 not exceeding a value meant by the input signals when the value meant by the input signals is not a power of 2, or (b) a minimum power of 2 exceeding a value meant by input signals when the value meant by the input signals is equal to the number of pixels forming the signal block.

8. A noise reduction method, comprising:
simultaneous processing step of allowing to simultaneously processing image signals of a portion containing a noise processing object pixel to be inputted, wherein (a) the image signals are existing in spatially different locations, or (b) the image signals are contained in fields or frames at different times in terms of time;
filter operation step of performing filter operations with respect to outputs of the simultaneous processing means;
noise components extraction step of extracting noise components based upon outputs of the filter operation step; and
noise attenuation step of attenuating noise using outputs of the noise components extraction step with respect to the noise processing object pixel within the outputs of the simultaneous processing step.

9. A program for operating a computer, comprising:
simultaneous processing means of allowing simultaneously processing image signals of a portion containing a noise processing object pixel to be inputted, wherein (a) the image signals are exiting in spatially different locations, or (b) the image signals are contained in fields or frames at different times in terms of time;
filter operation means of performing filter operations with respect to outputs of the simultaneous processing means;
noise components extraction means of extracting noise components based upon outputs of the filter operation means; and,
noise attenuation means of attenuating the noise using outputs of the noise components extraction means with respect to the noise processing object pixel within the outputs of the simultaneous processing means.

10. A program for a computer to execute, comprising:
simultaneous processing step of allowing to simultaneously processing image signals of a portion containing a noise processing object pixel to be inputted wherein (a) the image signals are existing in spatially different locations, or (b) the image signals are contained in fields or frames at different times in terms of time;

filter operation step of performing filter operations with respect to outputs of the simultaneous processing means;

noise components extraction step of extracting noise components based upon outputs of the filter operation step; and noise attenuation step of attenuating the noise using outputs of the noise components extraction step with respect to the noise processing object pixel within the outputs of the simultaneous processing step.

11. A medium having the program according to claim 9 or claim 10, wherein the medium is characterized in being processable by a computer.

* * * * *